United States Patent
Nakano et al.

(10) Patent No.: US 9,955,627 B2
(45) Date of Patent: May 1, 2018

(54) ELECTRIC WORKING MACHINE

(71) Applicant: HITACHI KOKI CO., LTD., Tokyo (JP)

(72) Inventors: Yasushi Nakano, Ibaraki (JP); Yuki Horie, Ibaraki (JP); Kazuhiko Funabashi, Ibaraki (JP); Yuuichi Toyoshima, Ibaraki (JP); Hiromi Ozawa, Ibaraki (JP); Hirohisa Tomita, Ibaraki (JP)

(73) Assignee: HITACHI KOKI CO., LTD., Tokyo (JP)

( * ) Notice: Subject to any disclaimer, the term of this patent is extended or adjusted under 35 U.S.C. 154(b) by 744 days.

(21) Appl. No.: 14/378,734

(22) PCT Filed: Feb. 15, 2013

(86) PCT No.: PCT/JP2013/054428
§ 371 (c)(1),
(2) Date: Aug. 14, 2014

(87) PCT Pub. No.: WO2013/122267
PCT Pub. Date: Aug. 22, 2013

(65) Prior Publication Data
US 2016/0021819 A1 Jan. 28, 2016

(30) Foreign Application Priority Data

Feb. 15, 2012 (JP) .................. 2012-031010
Feb. 15, 2012 (JP) .................. 2012-031011
Feb. 15, 2012 (JP) .................. 2012-031012

(51) Int. Cl.
*A01D 34/82* (2006.01)
*A01G 3/06* (2006.01)
(Continued)

(52) U.S. Cl.
CPC ........... *A01D 34/828* (2013.01); *A01D 34/73* (2013.01); *A01D 34/90* (2013.01); *A01D 34/902* (2013.01);
(Continued)

(58) Field of Classification Search
CPC ............... Y10T 16/4719; Y10T 16/473; Y10T 16/3267; Y10T 16/469; Y10T 16/476;
(Continued)

(56) References Cited

U.S. PATENT DOCUMENTS 4,930,386 A * 6/1990 Laskowski ............. B23D 53/04
414/546
6,181,032 B1 1/2001 Marshall et al.
(Continued)

FOREIGN PATENT DOCUMENTS

CN        2781734 Y      5/2006
DE     102 48 643 A1     4/2004
(Continued)

OTHER PUBLICATIONS

Japanese Office Action for the related Japanese Patent Application No. 2012-031010 dated Sep. 29, 2015.
(Continued)

*Primary Examiner* — Laura M Lee
(74) *Attorney, Agent, or Firm* — Kenealy Vaidya LLP

(57) ABSTRACT

An electric working machine including: a motor; a control unit configured to control rotation of the motor; a fixed part provided with a handle having a grip portion; a movable part held by the fixed part and is configured to be extendible by sliding relative to the fixed part; and a cutting blade provided to a end portion of the movable pipe and is configured to be driven by the motor; characterized in that the electric working machine further includes a detection unit which is connected to the control unit and is configured to detect
(Continued)

whether or not the movable part is positioned at a predetermined extended position relative to the fixed part.

15 Claims, 17 Drawing Sheets

(51) Int. Cl.
 *B25F 3/00* (2006.01)
 *B25F 5/02* (2006.01)
 *A01D 34/90* (2006.01)
 *A01D 34/73* (2006.01)
(52) U.S. Cl.
 CPC ............... *A01G 3/062* (2013.01); *B25F 3/00* (2013.01); *B25F 5/02* (2013.01); *Y10T 83/541* (2015.04); *Y10T 83/855* (2015.04)
(58) Field of Classification Search
 CPC ...... A01G 3/085–3/088; A01D 34/828; A01D 34/902; A01D 34/73; B25G 1/04; B23D 51/01; B23D 49/12; B23D 49/14; B23D 49/162
 USPC .............. 30/276, 347; 83/62, 62.1, 72, 76.7, 83/358–373, 58–76.9, 522.11–522.29, 83/399, 400, 626, 637
 See application file for complete search history.

(56) References Cited

U.S. PATENT DOCUMENTS

| | | |
|---|---|---|
| 2004/0079538 A1 | 4/2004 | Zerrer et al. |
| 2006/0005673 A1 | 1/2006 | Long et al. |
| 2006/0048397 A1 | 3/2006 | King et al. |
| 2007/0240892 A1 | 10/2007 | Brotto et al. |
| 2008/0196256 A1 | 8/2008 | Gieske et al. |
| 2012/0079799 A1 | 4/2012 | Matsunaga et al. |
| 2012/0242259 A1 | 9/2012 | Funabashi et al. |

FOREIGN PATENT DOCUMENTS

| | | |
|---|---|---|
| EP | 1 075 906 A2 | 2/2001 |
| EP | 1 634 679 A2 | 3/2006 |
| EP | 2 140 983 A2 | 1/2010 |
| JP | 63-158120 U | 10/1988 |
| JP | 5-199949 A | 8/1993 |
| JP | 6-62637 A | 3/1994 |
| JP | 6-153651 A | 6/1994 |
| JP | 3011271 U | 5/1995 |
| JP | 10-134603 A | 5/1998 |
| JP | 2011-142859 A | 7/2011 |
| JP | 2013-165674 A | 8/2013 |
| JP | 2013-165675 A | 8/2013 |

OTHER PUBLICATIONS

Japanese Office Action for the related Japanese Patent Application No. 2012-031011 dated Sep. 29, 2015.
Japanese Office Action for the related Japanese Patent Application No. 2012-031012 dated Sep. 29, 2015.
Chinese Office Action for the related Chinese Patent Application No. 201380009587.6 dated Jul. 30, 2015.
International Search Report and Written Opinion of the International Search Report for PCT/JP2013/054428 dated Jun. 21, 2013.

* cited by examiner

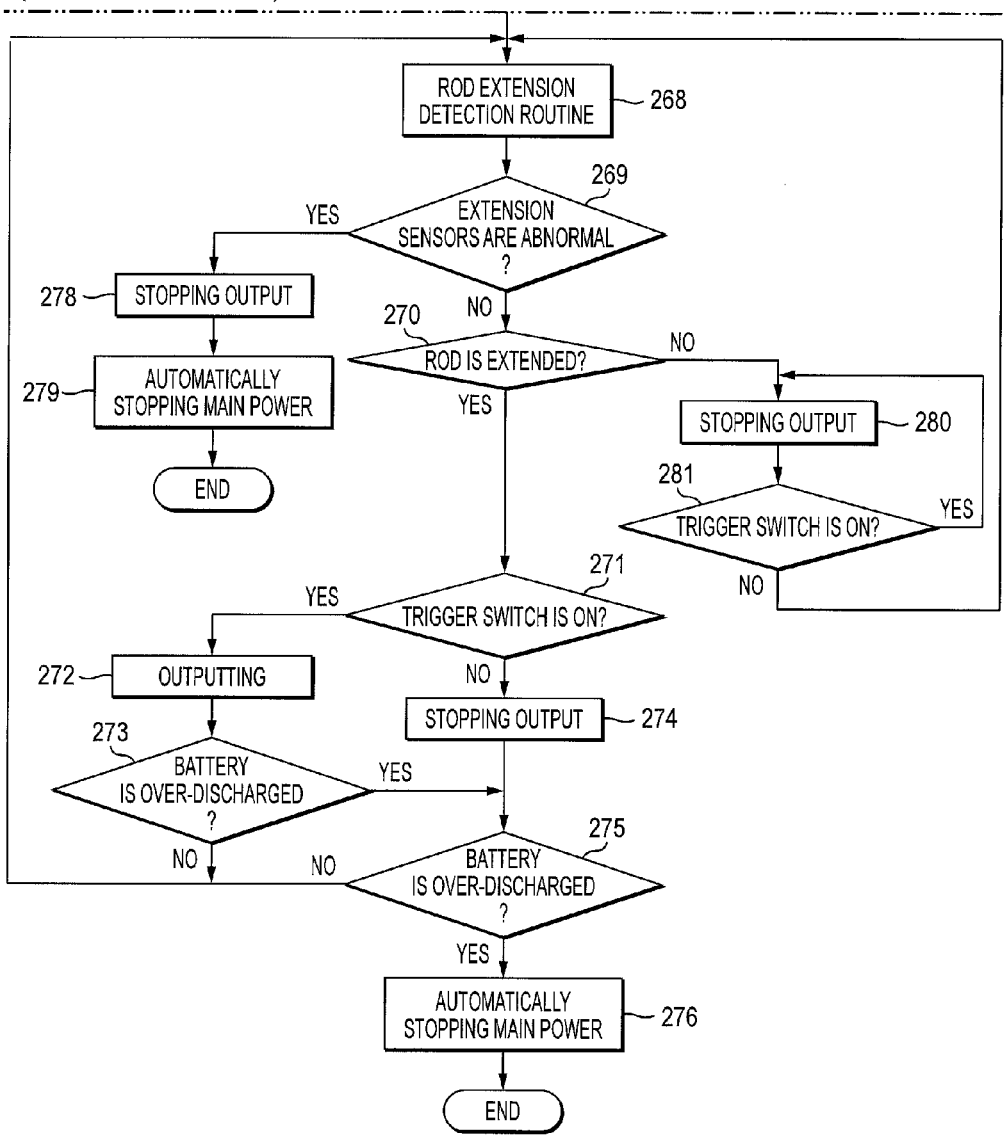

| ROD STATE | SWITCH | MAGNETIC SENSOR |
|---|---|---|
| EXTENSION | CLOSED (L OUTPUTTING) | L OUTPUTTING |
| RETRACTION | OPEN (H OUTPUTTING) | H OUTPUTTING |

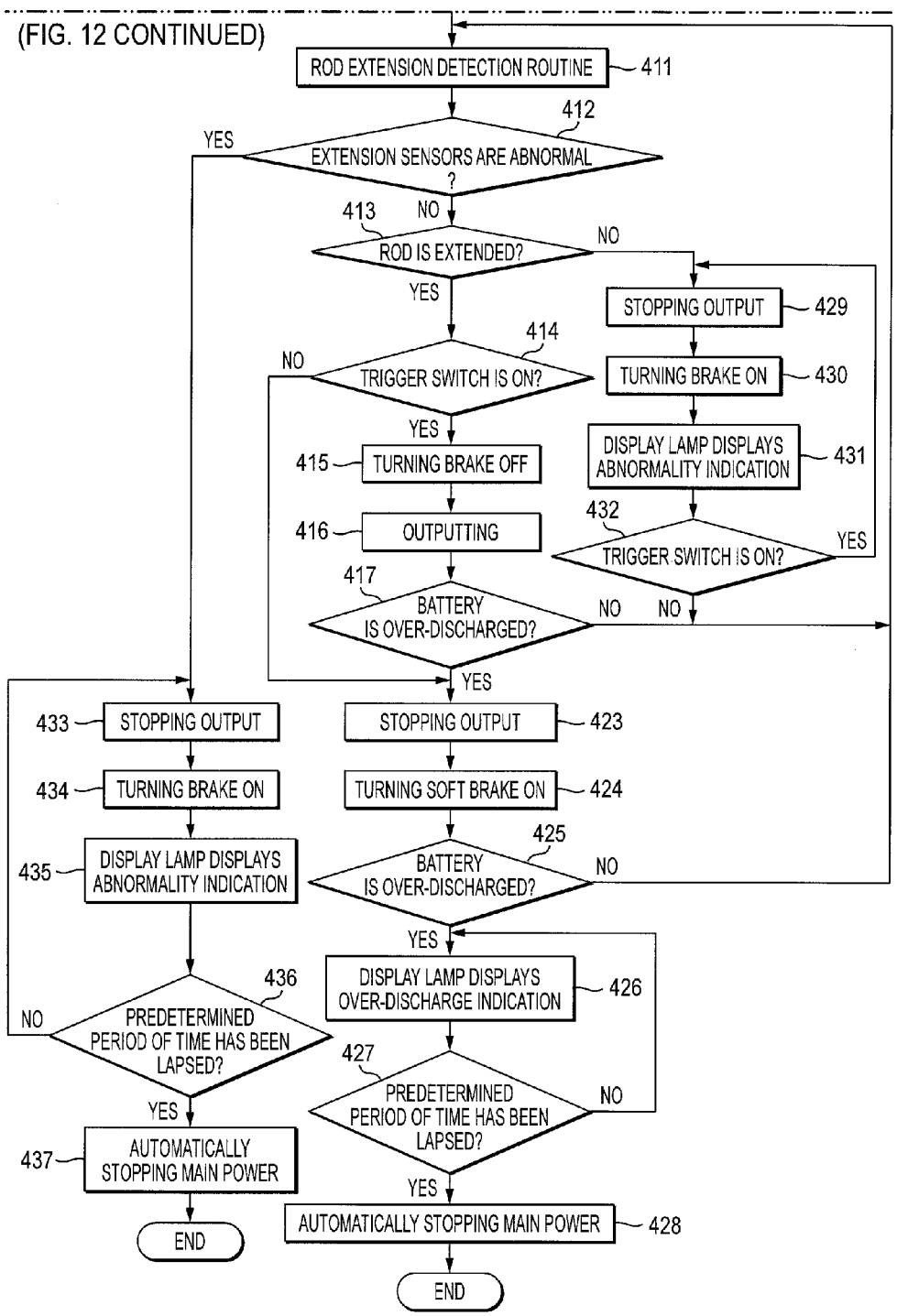

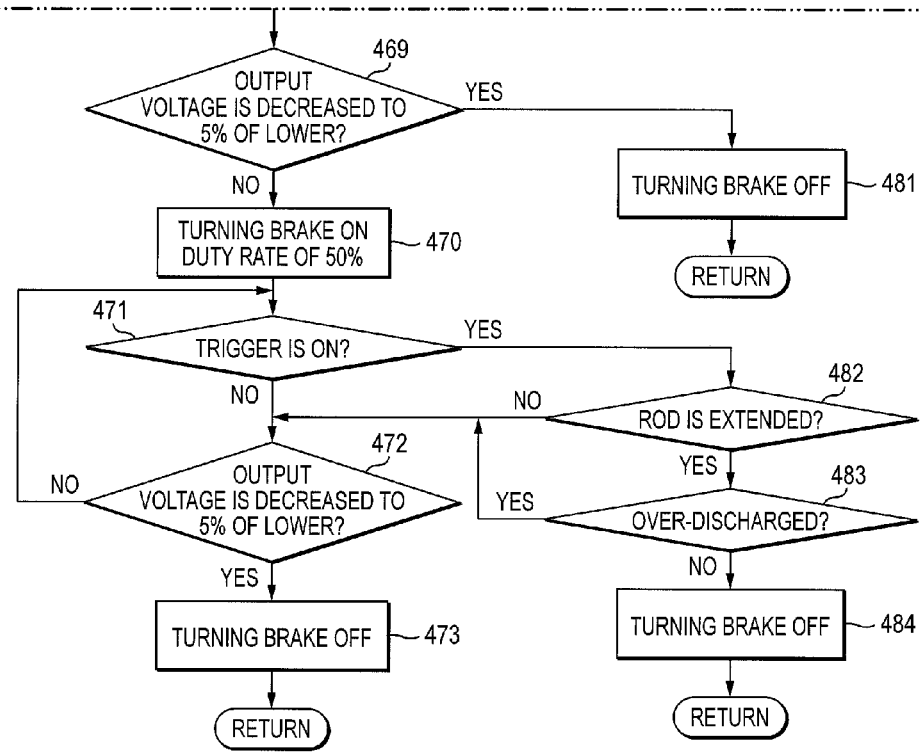

FIG. 14A
BLAKE ON
DUTY RATE OF 10%
PWM CONTROL
· FREQUENCY: 10kHz
· ON DUTY: 10%
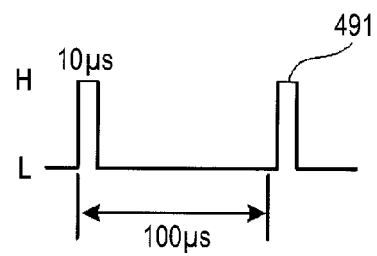
FIG. 14B
BLAKE ON
DUTY RATE OF 50%
PWM CONTROL
· FREQUENCY: 10kHz
· ON DUTY: 50%
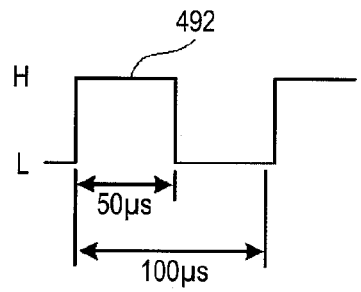
FIG. 15
DISPLAY LAMP
| NORMALITY INDICATION | LIGHTING |
|---|---|
| OVER-DISCHARGE INDICATION | SLOWLY FLICKERING |
| ABNORMALITY INDICATION | QUICKLY FLICKERING |

ELECTRIC WORKING MACHINE

TECHNICAL FIELD

Aspects of the present invention relate to an electric working machine driven by a motor.

BACKGROUND ART

As working machines for cutting grass or plants, bush cutters in which a rotary blade is driven are known. Although bush cutters using an internal combustion engine as a power source has been generally used, recently, electric bush cutters are practical and widely used due to an improved performance of rechargeable secondary cells. If an electric power is used as the power source of the bush cutters, there are features in that noise and exhaust gas are not emitted and running costs are excellent. Such electric bush cutters have been disclosed in Patent Document 1, in which a rotational number of a motor can be adjusted. A configuration of such an electric bush cutter according to the related art will be described with reference to FIG. 17. In an electric bush cutter 1001 driven by a battery pack 1002, a motor unit 1004 is attached to an end portion of a pipe shaped rod 1006 and a cutting blade 1005 is rotated by driving a motor (not shown) accommodated in the motor unit 1004 by the battery pack 1002. A scattering protection cover 1011 for preventing cut grass from being scattered is provided in the vicinity of the cutting blade 1005. The electric bush cutter 1001 is carried by a shoulder sling belt or the like not shown and includes a handle pipe 1007 for operation by a worker having an approximately U-shape when viewed form the front and attached to the vicinity of the center of the rod 1006 in a longitudinal direction of the rod 1006. Also, grip portions 1008a and 1008b are provided on both ends of the handle pipe 1007. A waist abutting member 1012 abutted to a waist of a worker during a work is provided in the vicinity of a portion of the rod 1006 between the handle pipe 1007 and an operation unit 1003. Rotation of the motor unit 1004 is controlled by a worker using a trigger lever 1009 attached on the grip portion 1008a. A rotational number of the motor unit 1004 is changed by varying a voltage applied to the motor and is adjusted by a dial 1010. In this way, the rotation velocity of the blade can be changed depending on an object to be cut and the shape thereof.

PRIOR ART DOCUMENT

Patent Document

[Patent Document 1] JP-A-2011-142859

SUMMARY OF INVENTION

Technical Problem

According to the electric bush cutter described in Patent Document 1, because a length of the rod 1006 is constant and cannot be adjusted, an electric bush cutter easy to be used by having a feeling of rigidity while being light in weight can be achieved. However, the demand of wanting to realize a compact electric bush cutter capable of reducing a storage space thereof has been issued from many users. Accordingly, an electric bush cutter in which a rod shape thereof is designed to be divided in a joint manner so that a storage size thereof can be reduced is commercialized by the applicant. Meanwhile, studies for further facilitating the reuse after storing or the storing work after using have been performed.

The present invention has been made keeping in mind the above problems, and an object of an aspect of the present invention is to realize an electric working machine which has a contracting rod and can become a compact shape upon storing.

Another object of an aspect of the present invention is to realize an electric working machine which is provided with a detection unit for detecting an extending state of a rod and thus has an enhanced safety.

Another object of an aspect of the present invention is to provide an electric working machine configured to prevent rotation of a motor when a rod is not extended.

Another object of an aspect of the present invention is to provide an electric working machine in which wiring from a detection unit for detecting an extending state of a rod to a control unit is improved.

Another object of the present invention is to provide an electric working machine, in which a sudden starting of a motor when a rod is moved from a non-extended state to an extended state while a trigger switch is pulled is prevented.

Solution to Problem

Advantageous Effects of Invention

Preferred features of the invention disclosed herein will be described as follows.

According to an aspect of the invention, there is provided an electric working machine including: a motor; a control unit configured to control rotation of the motor; a fixed part provided with a handle having a grip portion; a movable part held by the fixed part and is configured to be extendible by sliding relative to the fixed part; and a cutting blade provided to a end portion of the movable pipe and is configured to be driven by the motor; characterized in that the electric working machine further includes a detection unit which is connected to the control unit and is configured to detect whether or not the movable part is positioned at a predetermined extended position relative to the fixed part.

Accordingly, in the electric working machine having the movable part held by the fixed part and is configured to be extendible by sliding relative to the fixed part, the detection unit for detecting whether or not the movable pipe is positioned at a predetermined extended position relative to the fixed part is provided. Therefore, the control unit can perform a control depending on the detection results of the detection unit.

BRIEF DESCRIPTION OF DRAWINGS

FIG. 14 (14A, 14B) is a view showing an example of a PWM control upon controlling an electronic brake of the electric bush cutter according to the second embodiment of the present invention;

FIG. 15 is a view showing examples of a combination of display patterns of indicator lamps to be used in the control of FIG. 12;

DESCRIPTION OF EMBODIMENT

First Embodiment

Figure 1:
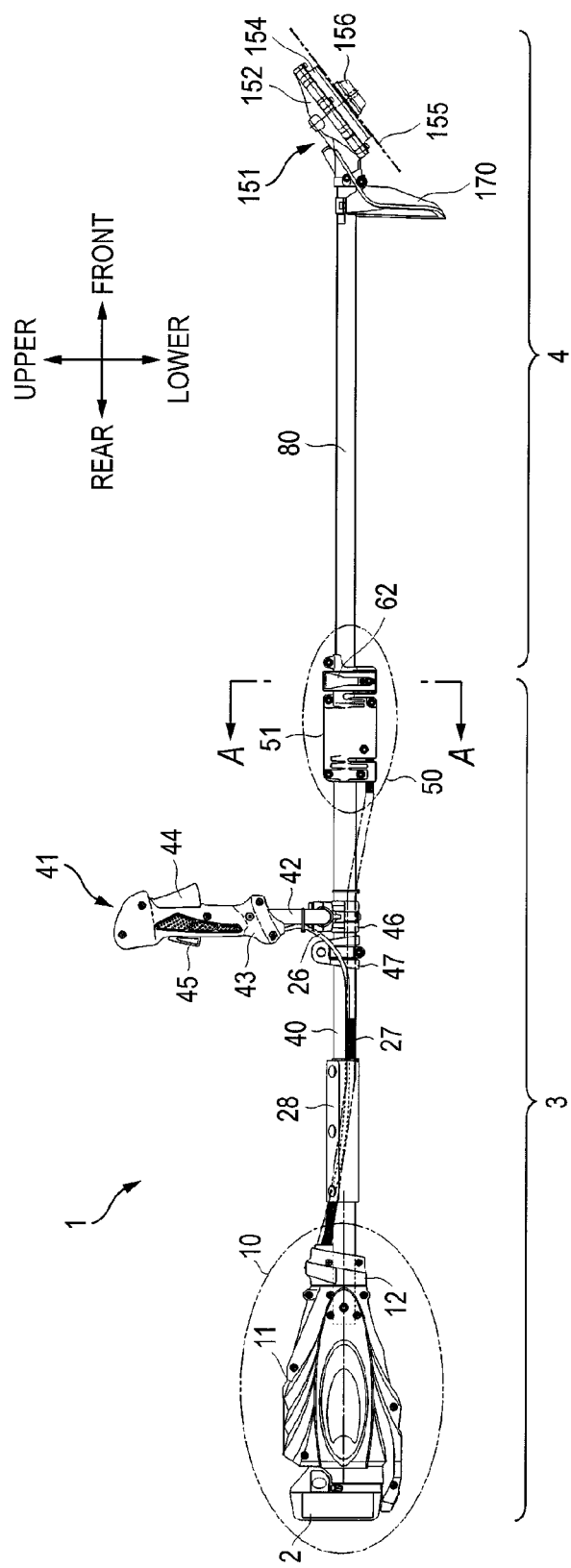
FIG. 1 is a side view showing the whole of an electric bush cutter according to an embodiment of the present invention, in which a rod is in an extended state.

An embodiment of the present invention will be described hereinafter with reference to the drawings. In the following drawings, identical reference numerals designate identical elements, and the detailed descriptions thereof will not be repeated. Also, in this specification, front-rear, left-right, and upper-lower directions will be described on the basis of directions shown in the drawings.

As shown in FIG. 1, an electric bush cutter 1, which is an example of an electric working machine, includes an operation unit 10 having a battery pack 2 attached thereto, a contracting rod fixed to the vicinity of a front end of the operation unit 10, a driving unit 151 attached to a end portion of the rod, and a handle unit 41 fixed to the vicinity of the center in a front-rear direction of the rod. In the present embodiment, the contracting rod includes a fixed pipe 40, and a movable pipe 80 connected on a front side of the fixed pipe 40 and adapted to be moved relative to the fixed pipe 40 in the front-rear direction. The operation unit 10, the fixed pipe 40, the handle unit 41 and a connection section 50 configure a fixed part 3 for fixing the movable pipe, and the fixed pipe 40 and the driving unit 151 configuring a main part of a work equipment attached on the front side thereof become a movable part 4 adapted to be moved relative to the fixed part 3.

The battery pack 2 accommodating a plurality of secondary cells, such as Li-ion cells, is mounted to a housing 11 of the operation unit 10, and also a control unit (a controller) for driving a motor incorporated in the driving unit 151 and a boosting circuit for boosting a DC voltage supplied from the battery pack 2 to a predetermined DC voltage and supplying the predetermined DC voltage to the motor are accommodated inside the housing 11. The fixed pipe 40 is attached to a front side of the operation unit 10. The fixed pipe 40 is an annular member made of a metal, such as aluminum alloy, and the handle unit 41 is arranged in the vicinity of the substantially center of the fixed pipe 40 in a front-rear direction of the fixed pipe 40. The handle unit 41 includes a hollow handle pipe 42 of an approximately U-shape when viewed from the front, and a grip portion 43 respectively attached to both ends of the handle pipe 42. The right grip portion of two grip portions 43 is formed as an operating portion and a trigger lever 44 is connected to the grip portion 43 to be pivoted about a rotation axis. A wire 26 is connected to the trigger lever 44, so that the trigger lever 44 is connected to a switch 21 disposed in the operation unit 10 via the wire 26. A lock lever 45 is provided at a front side of the trigger lever 44. The handle pipe 42 is bolted and fixed to the fixed pipe 40 using a handle holder 46. A fixing position of the handle holder 46 to the fixed pipe 40 may be configured to adjustable in the front-rear direction within a predetermined range. A belt holding portion 47 for attaching a shoulder sling belt is provided on a rear side of the handle holder 46.

On the front side of the fixed pipe 40 having a large diameter and fixed to the housing 11, the movable pipe 80 having a small diameter is connected relative to the fixed pipe 40. The movable pipe 80 is preferably formed of an annular member made of a metal, such as aluminum alloy, like the fixed pipe 40, and the movable pipe 80 is disposed to be pressed into the fixed pipe 40. A connection method in which a fixing position of the movable pipe 80 to the fixed pipe 40 is adjustable is employed such that a length of the rod constituted of the movable pipe 80 and the fixed pipe 40 can be varied. A connection of the movable pipe 80 to the fixed pipe 40 is fixed by a holder 51, and the holder 51 is provided with a fixing lever 62 for limiting a movement of the movable pipe 80 in a front-rear direction (an axial direction) thereof. In a state in which fixation of the movable pipe 80 by means of the holder 51 is loosened by operating the fixing lever 62, the movable pipe 80 is moved in the front-rear direction, and then the movable pipe 80 is tightened at a predetermined position by means of the holder 51 by operating the fixing lever 62, so that the movable pipe 80 is fixed not to be moved. The electric bush cutter 1 performs a work in a state in which the movable pipe 80 is most extended from the fixed pipe 40, as shown in FIG. 1. Also, the holder 51 is provided with an extending detection unit as described later, and thus the driving unit 151 is configured not to be operated when the movable pipe 80 is not fully extended (e.g., a non-extended state). In addition, if the movable pipe 80 is not completely fixed or the movable pipe 80 is retracted due to a certain cause during bush cutting work, the driving unit 151 is configured to automatically stop a rotating operation thereof.

Figure 17:
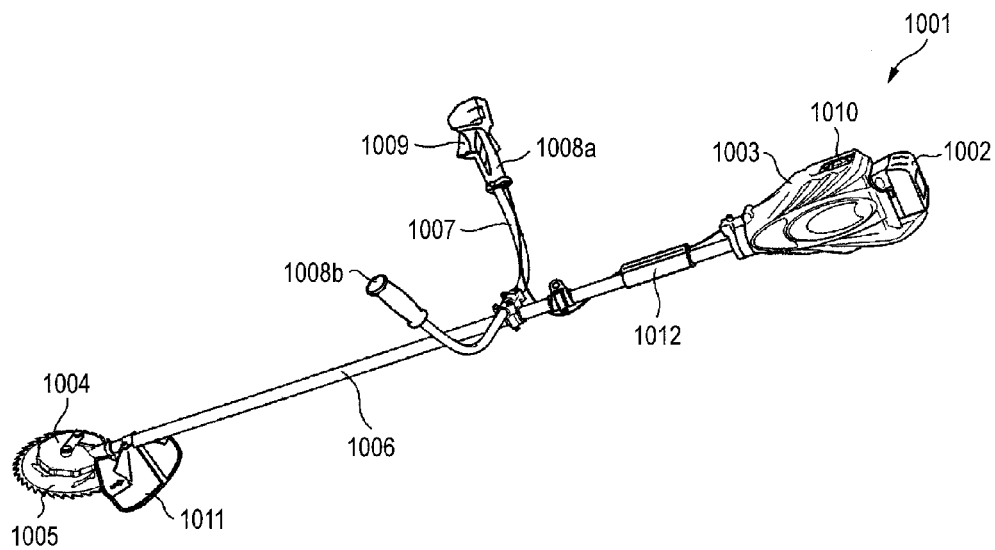
FIG. 17 is a perspective view showing the whole appearance of an electric bush cutter according to the related art.

The handle unit 41 is attached to the fixed pipe 40. By attaching the handle unit 41 to the fixed pipe 40, rigidity of a part including the handle unit 41, a waist abutting portion 28 and the operation unit 10 can be increased. Furthermore, the shoulder sling belt is also held by the belt holding portion 47 attached on the fixed pipe 40. Therefore, all parts, on which forces are applied during work, are attached to the fixed pipe 40. The shape of the handle pipe 42 is preferably identical to the shape of the handle pipe 1007 as described in FIG. 17, but a loop handle (a D-shaped handle) widely used in bush cutters may also be used, besides the handle pipe 42 having an approximately U-shape when viewed from the front. Even when the D-shaped handle is used, it is important to fix the handle pipe to the fixed pipe 40, not to the movable pipe 80. The wire 26 connected to the trigger lever 44 of the handle unit 41 extends from the handle pipe 42 along the fixed pipe 40 through an inside of the waist abutting portion 28 and then is connected to the operation unit 10. Also, a bellows tube 27 covering a connection line (described below) for transmitting an output from the extending detection unit as described below extends from the holder 51 of the connection section 50 along the fixed pipe 40 through the inside of the waist abutting portion 28, and then is connected to the operation unit 10. A cord stopper 12 is provided to a front side of the housing 11 of the operation unit 10, so that the wire 26 and the bellows tube 27 are held not to be moved in the front-rear direction.

In the driving unit 151, a motor (described below) having a direct current brush, such as a so-called coreless motor, is accommodated inside a motor case 152 made by molding aluminum alloy or the like, and a cutting blade 155 is rotated by rotation of the motor. Thus, because the electric motor is used, high quietness can be achieved, compared to a bush cutter employing a 2-cycle engine. A fan cover 154 is provided under the motor accommodated in the motor case 152, and the cutting blade 155 is mounted on an output shaft (not shown) protruding downward from the fan cover 154 by means of a holder 156. A scattering protection cover 170 for covering a portion of the cutting blade 155 is provided adjacent to the motor attached to an end portion of the movable pipe 80. As the cutting blade 155, a circular chip saw made of metal can be used but is not limited thereto. Any other cutting means, such as, a nylon cord cutter, a reciprocating clipper means, or a trimmer means, may also be used.

The coreless motor (not shown) adapted to rotate at a velocity depending on a voltage inputted is accommodated inside of the motor case 152. The coreless motor is relatively lightweight because there are no gears or cores. Also, because the cutting blade is driven by a center shaft of the coreless motor, namely the cutting blade is directly connected to the motor, not via gears and the like, mechanical loss can be suppressed and gear sounds are not generated, and thus the occurrence of noise is small. In addition, the coreless motor is configured to be rotated by generation of a magnetic field extending through coil substrates in an axial direction of a center axis thereof, so that a rotating shaft of the motor is arranged to be tilted at about 45 degrees on the end portion of the movable pipe 80 and also do not protrude in an upper-lower direction along a center axis of the driving unit 151, thereby achieving a compact shape.

Figure 2:
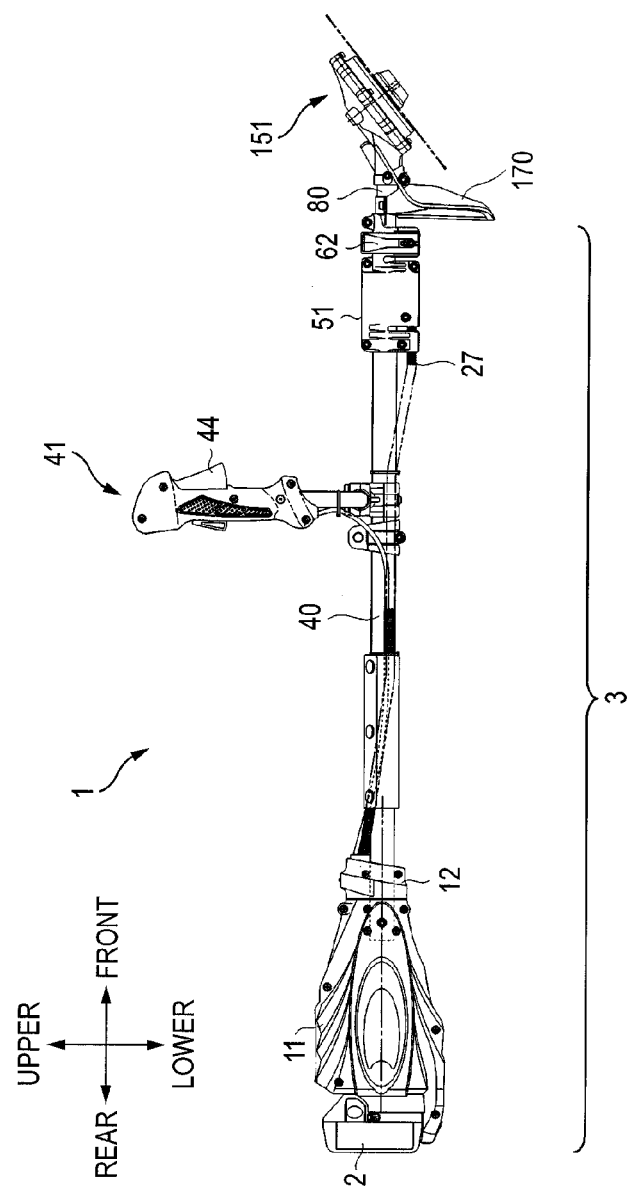
FIG. 2 is a side view showing the whole of the electric bush cutter according to the embodiment of the present invention, in which the rod is in a retracted state (a non-extended state)

FIG. 2 shown the electric bush cutter 1 in which the movable pipe 80 is most retracted into the fixed pipe 40. In the present embodiment, the total length (a distance from a rear end of the battery pack 2 to an end portion of the motor case 152 of the driving unit 151) of the electric bush cutter in an extended state of FIG. 1 is, for example, 1880 mm According to such an arrangement, the operation unit 10 and the driving unit 151 is sufficiently spaced away from each other, and the center of the electric bush cutter 1 is sufficiently deviated from the operation unit 10, so that a moderate weight is applied to a user, thereby enhancing workability. Meanwhile, upon storing and transporting the electric bush cutter 1, a retracted state as shown in FIG. 2 is taken. The scattering protection cover 170 abuts on the holder 51 when the movable pipe 80 is retracted, and thus serves as a stopper with respect to a moving position upon retracting. In this time, the total length is about 1350 mm, and thus the rod can be shortened by 500 mm or more. Meanwhile, in the retracted state of FIG. 2, it is important that the motor is configured not to be driven even if the trigger lever 44 is pulled.

Figure 3:
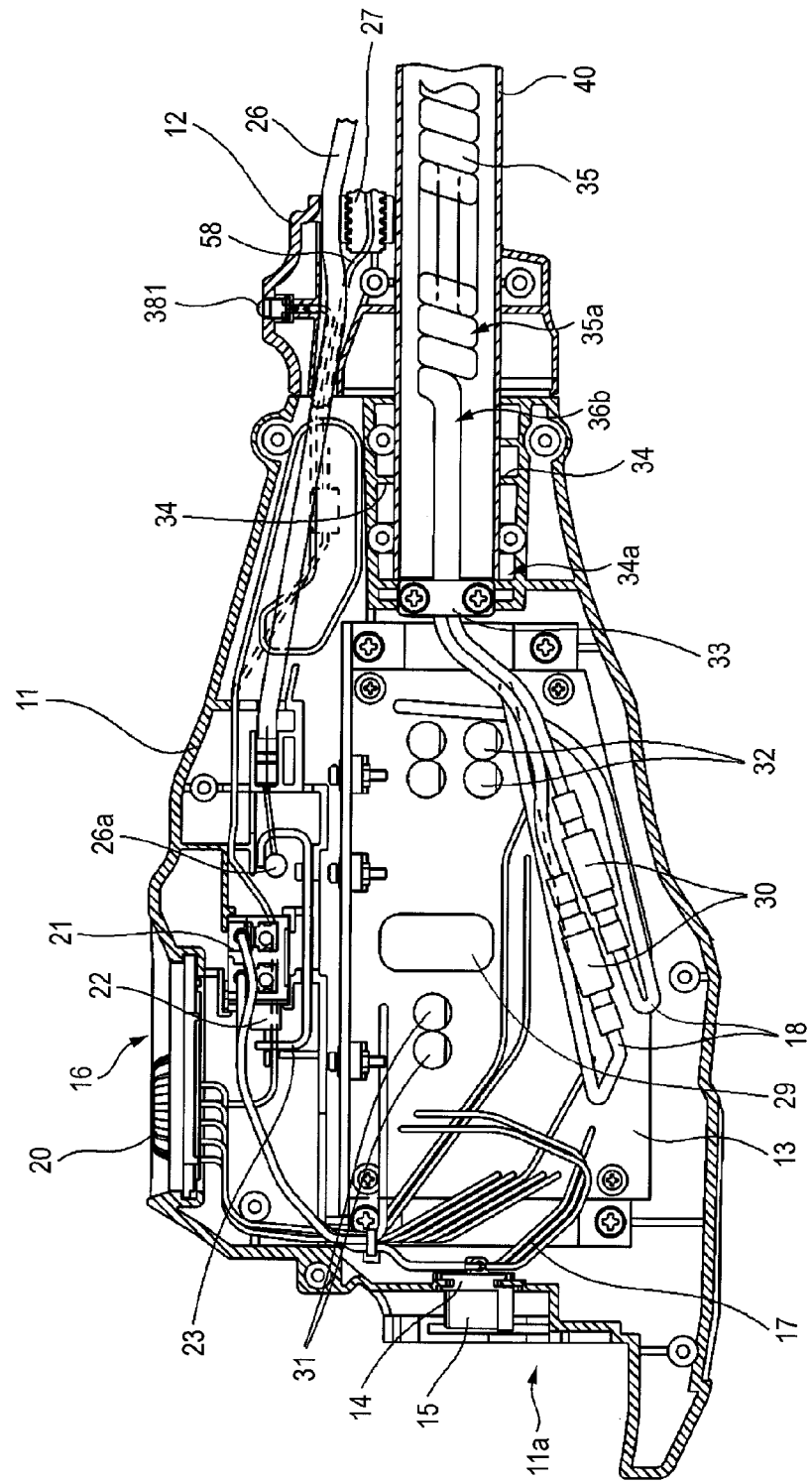
FIG. 3 is an enlarged view showing an operation portion 10 of the electric bush cutter 1 of FIG. 1.

FIG. 3 is an enlarged view of the operation unit 10 of the electric bush cutter 1, showing a state in which one side of the housing 11 of left and right division type is removed. Here, the fixed pipe 40 is not shown in a side view but in a sectional view. A circuit board 13 having a boosting circuit or a control circuit (a controller) mounted thereon is accommodated inside the operation unit 10. The fixed pipe 40 is attached to an attaching boss 34 on the front side of the housing 11. The fixed pipe 40 is a hollow pipe formed of a lightweight and rigid material, such as aluminum alloy or reinforced plastics, and has, for example, an approximately circular cross-section, and a curled cord 35 is arranged therein. The curled cord 35 is a power supply line adapted to supply an electric power for driving the motor from the circuit board 13 to the motor (see FIG. 1). The housing 11 is formed in a left and right division type to be divided into two parts, and the fixed pipe 40 is held by the attaching boss 34 provided by being integrally molded with an inner wall section of the housing. A rear surface of the attaching boss 34 is provided with an end surface 34a, and a fixture 33 for fixing the vicinity of an end of the curled cord 35 is provided in the vicinity of the end surface 34a. The cord stopper 12 for fixing the wire 26 and the bellows tube is provided at the front side of the housing 11 and in the vicinity of a joint of the housing 11 to the fixed pipe 40. A signal line 58 is provided for transmitting a signal from the extending detection unit as described below and is protected from breakage due to bending by the bellows tube 27.

A battery mounting portion 11a is a portion for mounting the battery pack 2 severing as a power supply, and becomes a connection portion to the power supply. The battery pack 2 is mounted to the battery mounting portion 11a by sliding the battery pack 2 from upper to lower as shown in FIG. 1. The battery mounting portion 11a is provided with a terminal base 14 for holding a plurality of terminals 15 and can supply an electric power from the battery pack 2 to the circuit board 13 because output terminals (not shown) of the battery pack 2 are connected to the terminals 15 when the battery pack 2 is mounted on the battery mounting portion 11a. The terminals 15 and the circuit board 13 are connected to each other by a plurality of lead wires 17. The housing 11 is provided, at an upper surface thereof, with an operation panel 16, on which a main power switch (described below), a battery remaining indicator, and a main LED (Light Emitting Diode) are arranged. When the main power switch is turned on, an electric power is supplied to a micro computer (described below) mounted on the circuit board 13, thereby leading to a standby mode allowing supplying the electric power to the motor. When the main power switch is turned off, the circuit board 13 does not output the electric power to the motor, even if the trigger lever 44 (see FIG. 1) is pulled. The electric power from the circuit board 13 is supplied to the motor via a stretchable curled cord 35. The curl cord 35 is called also as a spring cable and formed by covering a plurality of electric wires wound in a stretchable coil shape together by resin, thus used in a place requiring stretchability. Also, the curl cord 35 has an excellent abrasion resistance, thereby exhibiting a feature in that the curl cord 35 can withstand repeated uses. The curled cord 35 includes a spring portion 35a wound in a coil shape and an end portion 35b formed in a straight shape at each of both ends of the spring portion 35a. According to the present embodiment, the curl cord 35 is disposed in inner spaces of the fixed pipe 40 and the movable pipe 80, so that the curl cord 35 is arranged to be invisible to an operator. The other end of the curl cord 35, which is not shown in FIG. 3, is disposed to an attaching portion (not shown) of the movable pipe 80 to the driving unit 151 and is connected to plus and minus terminals of the motor accommodated in the driving unit 151 via connection terminals (not shown).

A rotation speed of the motor for driving the cutting blade 155 is set by a dial 20 provided to the operation panel 16, and thus a DC voltage supplied from the boosting circuit (not shown) to the motor is set to achieve the set rotation speed. If the trigger lever 44 (see FIG. 1) is pulled in the standby mode in which the main power switch is turned on, a predetermined DC voltage is supplied from the circuit board 13 to the motor. When the trigger lever 44 is pulled, the wire 26 is drawn to move a wire end 26a thereof, and thus a movable plate 23 is moved in a front-rear direction. A rear end of the movable plate 23 is arranged to be abutted to a plunger 22 of a switch 21, so that movement of the wire 26 is transferred to the switch 21. Thus, when the trigger lever 44 is pulled, the switch 21 is turned on (in a connected state). According to the present embodiment, a trigger switch is configured by the trigger lever 44, the wire 26, the movable plate 23, the switch 21 and the like. However, the trigger switch does not necessarily need to be configured by such plurality of components, but may be configured such that, instead of the trigger lever 44 (see FIG. 1) of the grip portion 43, a trigger switch integrally formed with a lever may be provided and also, instead of the wire 26, a lead may extend into the housing 11. Also, the trigger switch may embodied by any other switching means. The setting of the dial 20 is transmitted as a change in resistance value to the circuit board 13, and the micro computer as described later adjusts an voltage to be outputted, depending on ON/OFF of the trigger lever 44 and the setting value of the dial 20.

The circuit board 13 includes the boosting circuit (not shown) for boosting a voltage outputted from the battery pack 2 to a high voltage for the DC motor. Therefore, electronic elements for the boosting circuit, such a plurality of capacitors 31 and 32 and a coil 29, are mounted on the circuit board 13. To what extent an amount of the output voltage from the battery pack 2 is boosted is determined depending on the setting value of the rotary dial 20. In the present embodiment, for example, 14.4V or 8V Li-ion cells are used as the battery pack 2, and a brush DC motor having a rated voltage of 38V is used as the motor. In this way, regardless of the output voltage of the battery pack 2, the circuit board 13 supplies a voltage of a value depending on the setting value of the dial 20 to the motor, and thus types (a rated voltage) of the battery pack 2 will be not a matter. Also, because the boosting circuit is used, it is possible to perform a work at a sufficiently high rotational number, even if cells have a small capacity. In addition, a combination of types and rated voltages of the battery pack 2 or the motor used, to what extent the boosting circuit boosts the voltage, and the like is arbitrary, and thus configurations other than examples described in the present embodiment may be employed.

A connection of a power supply line 18, which extends from the circuit board 13, to the curled cord 35 serving as another power supply line is achieved via a connection terminal 30. According to the present invention, the curled cord 35 includes two plus and minus electric wires. The circuit board 13 has a protection ability of protecting the battery pack 2 and the motor from an overcurrent or overvoltage, and thus is provided with a controller (described below) performing a control for braking rotation of the motor by forcibly cutting off an electric power supplied to the motor or by supplying a brake current to the motor, upon detecting the overcurrent or overvoltage. A detailed circuit configuration or an operation of the controller mounted on the circuit board 13 will be described later. The cord stopper 12 provided on the front side of the housing 11 holds the bellows tube 27 and the wire 26, thereby, guiding the signal line 58 and preventing an operation failure due to bending of the wire 26 and the like. The cord stopper 12 is provided, on an upper side thereof, with a LED 381.

Figure 4:
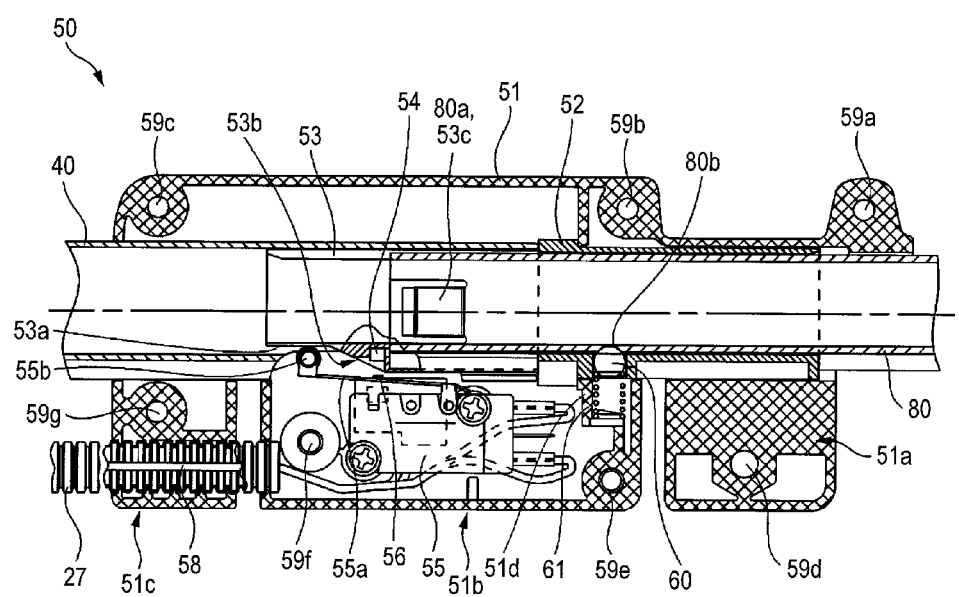
FIG. 4 is a sectional view showing a connection section 50 of the electric bush cutter 1 of FIG. 1 (a first sectional view)
Figure 5:
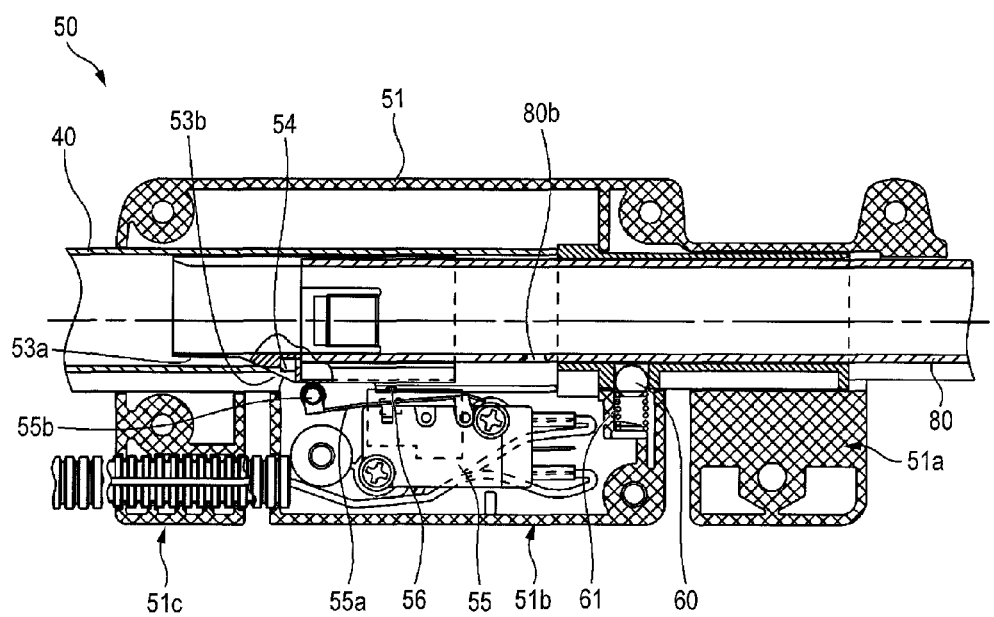
FIG. 5 is a sectional view showing the connection section 50 of the electric bush cutter 1 of FIG. 1 (a second sectional view)

Next, a detailed configuration of the connection section 50 of the electric bush cutter 1 will be described with reference to FIGS. 4 and 5. FIGS. 4 and 5 are sectional views of the connection section 50 of the electric bush cutter 1. FIG. 4 shows a state in which the movable pipe 80 is locked not to be moved in an axial direction relative to the fixed pipe 40 with the movable pipe 80 most extended. In this way, bush cutting work can be performed in an extended state of the rod, namely, an extended state of the movable pipe 80. The holder 51 is fixed on a connection portion of the fixed pipe 40 to the movable pipe 80, which corresponds to an end portion of the fixed pipe 40. The holder 51 is a member for accommodating a lock mechanism for fixing the movable pipe 80 relative to the fixed pipe 40 and for installing the extending detection unit for detecting whether or not the movable pipe 80 is extended to a predetermined extended position. The holder 51 is formed in a left and right division type to be divided into two parts, each of which is produced by integral molding of a polymeric resin, such as plastic. Two parts divided into left and right are fastened to each other by seven screws (not shown) provided on screw bosses 59a to 59g with the fixed pipe 40 sandwiched therebetween. Also, an adhesive may be additionally used to more firmly fix the holder 51 to the fixed pipe 40. A rear end of a stopper 52 is arranged to abut on a front end surface of the fixed pipe 40, and an inner circumferential side of the cylindrical stopper 52 holds the movable pipe 80 such that the movable pipe 80 can move in an axial direction (a front-rear direction). A through-hole 80b is formed in a portion of the movable pipe 80. When the movable pipe 80 is located at an extended position, a portion of a ball 60 moves from outside to inside in a radial direction and enters the through-hole 80b to provide a click feeling, so that a fixation position upon extending can be recognized. The outer circumferential side (the lower side in the figure) of the ball 60 is biased by a spring 61 held inside the holder 51 so that the ball 60 is urged toward the movable pipe 80. The spring 61 is accommodated in a spring receiving portion 51d of a cylindrical shape formed in a portion of a housing for the stopper 52.

When attempting to release the lock mechanism of the movable pipe 80 using the ball 60, the movable pipe 80 is strongly moved toward the fixed pipe 40 so that the ball 60 can be moved against a biasing force of the spring 61, thereby releasing the locked state. However, in the lock mechanism using only the ball 60, there is a risk that the locked state is released during a bush cutting work. Therefore, according to the present embodiment, in addition to the lock mechanism using the ball 60, a lock mechanism, which acts in cooperation with spring plates 51 provided on both left and right sides of the holder 51 to narrow a distance between two spring plates 51a and to strongly tighten the movable pipe 80, is additionally used. A fixing lever 62 (see FIG. 1) is provided to strongly limit the axial movement of the movable pipe 80 with the movable pipe 80 sandwiched between two spring plates 51a.

A switch box 51b of the holder 51 is provided therein with two systems of the extending detection unit for detecting whether or not the movable pipe 80 is extended to a predetermined position. The extending detection unit detects positions or states of the movable pipe 80 by any detecting methods, such as electrical, mechanical, or optical method and output the corresponding electric signals to a control unit (controller) mounted on the circuit board 13. One of the extending detection unit is a mechanical switch 55, such as a microswitch. A pulley 55b is provided to an end portion of a lever 55a configured to turn the switch 55 on or off. According to the present embodiment, the lever 55a presses a plunger of the switch 55 to turn the switch 55 on when the pulley 55b is moved downward in the figure, whereas the lever 55a releases the plunger of the switch 55 to turn the switch 55 off, when the pulley 55b is located at an upper position as shown. The switch 55 is connected to the circuit board 13 (see FIG. 3) via the signal line 58. A sleeve 53 is provided in the vicinity of the pulley 55b and to a rear end of the movable pipe 80.

The curled cord 35 (not shown) is spaced away from the pulley 55b and the lever 55a by the sleeve 53, so that the pulley 55b and the lever 55a do not contact with the curled cord 35 upon moving of the lever 55a. Also, there is no need to provide a recess for turning on/off of the switch 55 to the movable pipe 80 itself, and thus distortion or bending of the movable pipe 80 is not caused. The sleeve 53 is provided with a hook shaped latch 53c, so that, when the sleeve 53 is fitted to the movable pipe 80, the latch 53c is fitted into a rectangular mortising hole 80a formed in the movable pipe 80 and thus the sleeve 53 is fixed not to be pulled out from the movable pipe 80. Also, the sleeve 53 is provided to cover at least a portion of an outer circumferential side of the movable pipe 80, so that, when the movable pipe 80 is drawn out to the maximum, a front end of the sleeve 53 is abutted on a rear end of the stopper 52, thereby serving as a retainer for preventing the movable pipe 80 from being pulled out from the fixed pipe 40. In addition, the sleeve 53 is provided with a recess 53a on a sliding portion thereof relative to the pulley 55b of the switch 55, and the pulley 55b is disposed in the recess 53a so that the lever 55a is moved to turn the switch 55 on. An inclined surface 53b is formed on a portion transiting from the recess 53a of the sleeve 53 to an outer circumferential portion of a front side thereof. Thus, when the movable pipe 80 is retracted toward the fixed pipe 40 from a state as shown in FIG. 4, the pulley 55b is guided outward in a radial direction by the inclined surface 53b, so that the switch 55 is turned from the on-state (the state as shown in FIG. 4) to the off-state as described below in FIG. 5.

The other extending detecting means for detecting whether or not the movable pipe 80 is extended is configured by a magnet 54 provided on a portion of the sleeve 53 and a Hall IC 56. The Hall IC 56 is formed by turning an element for detecting a magnetic filed using Hall effect into an IC. According to the present embodiment, the Hall IC 56 is configured such that an output thereof is Low state when the magnet 52 is close to the Hall IC 56 and is High state when the magnet 54 is spaced away from the Hall IC 56. The output 56 of the Hall IC 56, together with the signal of the switch 55, is transferred to the circuit board 13 by the signal line 58. The signal line 58 is a four wire cable and is disposed inside the bellows tube 27 to prevent the signal line from breakage due to forces or vibrations exerted from the outside. The bellows tube 27 brought out from the holder 51 is fixed by a signal line guide 51c. Also, although not shown in FIGS. 4 and 5, the curled cord 35 shown in FIG. 3 is disposed inside the fixed pipe 40 and the movable pipe 80, and thus the curled cord 35 is arranged in distance variable portions of from the fixed pipe 40 to the motor. Contrarily, the signal line 58 is a cable for connecting non-variable distance portions between the holder 51 and the operation unit 10, and thus does not need to use a stretchable cable, such as a curled cord. Therefore, according to the present invention, the signal line 58 is arranged along the outside of the fixed pipe 40, not along the inside thereof. The reason that the signal line 58 is arranged outside the fixed pipe 40 and the curled cord 35 is arranged inside the fixed pipe 40 in this way is because a disturbance to expansion and contraction of the curled cord 35 can be avoided as mush as possible, and easy wiring and aesthetic appearance can be achieved. Of course, the signal line 58 may be arranged inside the fixed pipe 40. However, in this case, expansion and contraction of the curled cord 35 may be preferably considered not to be inhibited by the signal line 58. The wiring inside the fixed pipe 40 and the movable pipe 80 may be a wiring which is not influenced by any stretchable means or extension and retraction of the pipes, and thus any stretchable cords other than the curled cord may be used. In addition, the bellows tube 27 is intended to protect the signal line 58, and thus may be any tubular member.

FIG. 5 shows a state in which the movable pipe 80 is slightly retracted from the extended state of FIG. 4. To retract the movable pipe in this way, it is necessary to release the tightened state by the fixing lever 62 (see FIG. 1) and then move the movable pipe 80. In this retracted state, the pulley 55b is located (i.e., ridden) on the large diameter portion of the sleeve 53 after passing over the inclined surface 53b. As a result, the lever 55a is pressed against the switch 55, thereby turning the switch 55 on. Also, because the magnet 54 is spaced away from the Hall IC 56, the magnetic field of the magnet 54 is not acted on the Hall IC 56 and thus the output of the Hall IC 56 becomes the High state indicating a state in which the magnet 56 is spaced away therefrom. In addition, the through-hole 80b of the movable pipe 80 is spaced away from the ball 60, so that the ball 60 is moved downward (i.e., radially outward as considered from the movable pipe 80) against the biasing force of the spring 61.

Figure 6:
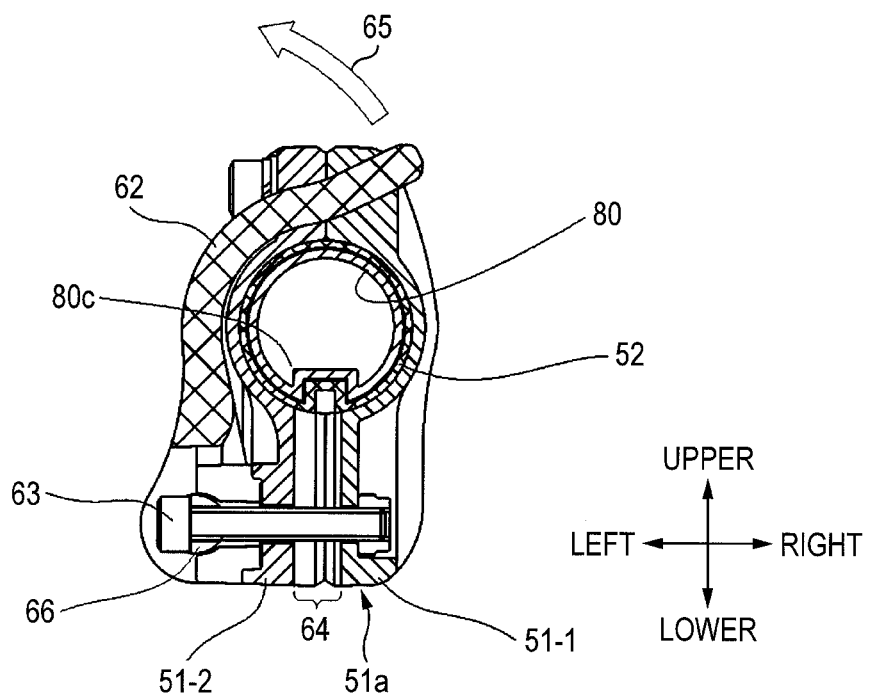
FIG. 6 is a sectional view taken along a line A-A in FIG. 1.

FIG. 6 is a sectional view taken along a line A-A in FIG. 1. In the holder 51 shown in FIGS. 4 and 5, inner surfaces of the left part 51-1 and the right part 51-2, which are positioned at a portion corresponding to the spring plate 51a (in the vicinity of a reference numeral 64), do not contact with each other, but is configured to be tightened by a bolt 63. The bolt 63 is configured to tighten the movable pipe 60 when the fixing lever 62 is moved to a position shown and to increase the gap between the left part 51-1 and the right part 51-2 when the fixing lever 62 is pivoted from a state shown in a direction of an arrow 65. The center 66 for pivoting of the fixing lever 62 in the direction of the arrow 65 and in the opposite direction is located at the vicinity of a head of the bolt 63. By pivoting the fixing lever 62 in the direction of the arrow 65, the tightened state of the movable pipe 80 by the stopper 52 is released. When the fixing lever 62 is moved to approach the holder 51 as shown in FIG. 6, the movable pipe 80 is strongly tightened by the stopper 52. In addition, the configuration in which the tightening is performed by the fixing lever 62 may employ known tightening techniques. According to the present embodiment, the movable pipe 80 does not have a cross-sectional shape of a complete circle, but has a rail portion 80c (a groove as viewed radially from the outside) formed to extend in an axial direction thereof at an lower side thereof. Although not shown, the fixed pipe 40 has also a rail portion corresponding to the rail portion 80c, and these rail portions are engaged with each other to hold the movable pipe 80 and the fixed pipe 40 to prevent a relative rotation therebetween. In this way, although the manufacturing cost is increased by forming the rail portion 80c, it is possible to increase the rigidity of the movable pipe 80 and the fixed pipe 40, and to achieve a lightweight and high rigid rod structure.

Figure 7:
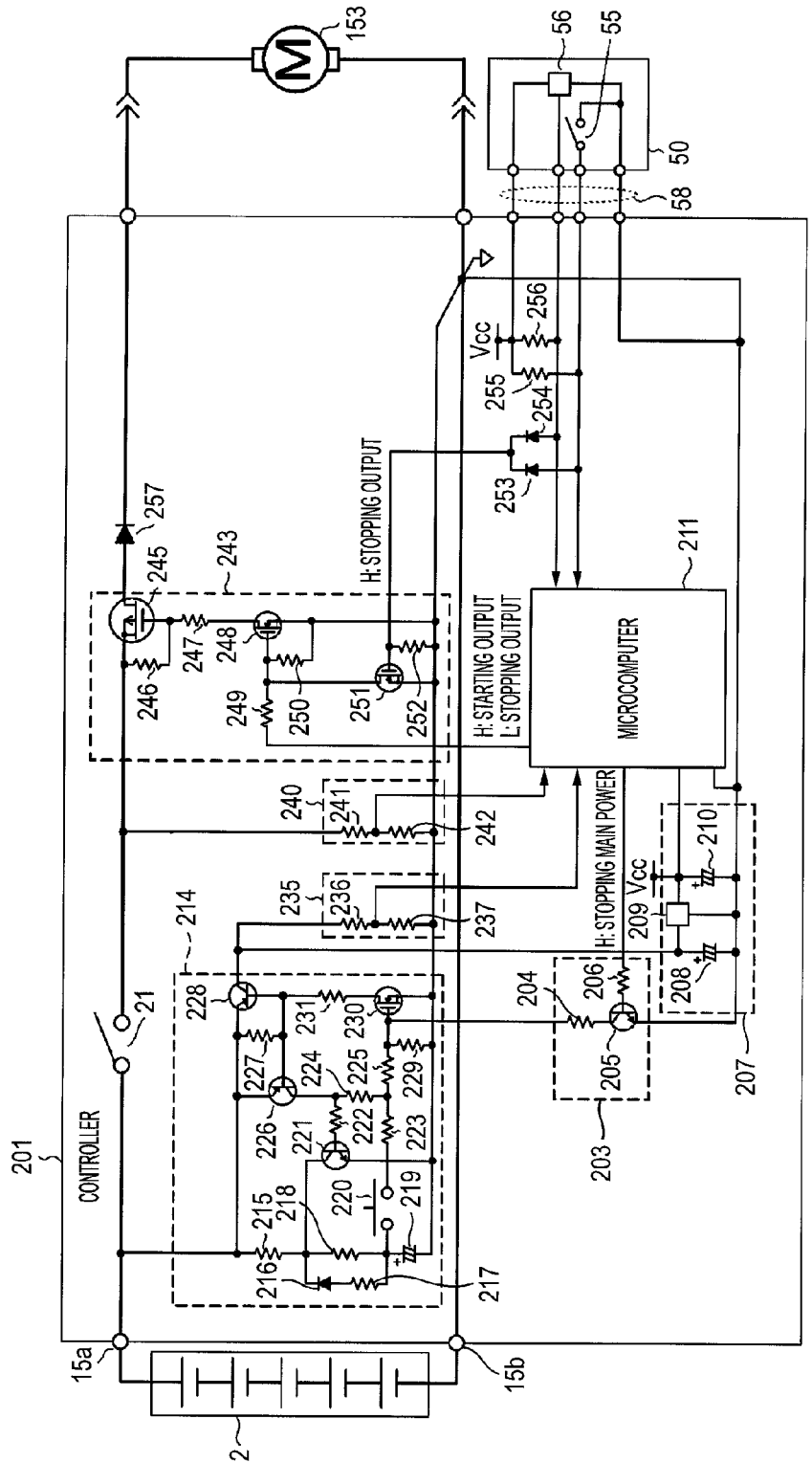
FIG. 7 is a circuit diagram of the electric bush cutter 1 of FIG. 1.

Hereinafter, a circuit diagram of the electric bush cutter 1 will be described with reference to FIG. 7. A controller 201 illustrated in the circuit diagram is mounted on the circuit board 13. Also, the actual circuit is provided with a flyback-type boosting circuit, but in the present embodiment, the illustration or description thereof is omitted for convenience of explanation. The controller 201 is configured to receive an electric power from the battery pack 2 and rotate the motor connected to an output side thereof. The motor 153 is a coreless brush motor driven by direct current, and a rotational number thereof is varied depending on a DC voltage applied to the motor 153. The controller 201 mainly includes a switch (trigger switch) 21, a main power switch circuit 214, a battery voltage detection circuit 235, a trigger detection circuit 240, a main power automatic stop circuit 203, a constant voltage circuit 207, a microcomputer 211, and an output stop circuit 243.

When the battery pack 2 is mounted on the battery mounting portion 11a (see FIG. 3), an electric power is supplied from the battery pack 2 to the controller 201 via the terminals 15 (the plus terminal 15a and the minus terminal 15b). Then, when the main power switch 220 in the main power switch circuit 214 is turned on, a voltage from the battery pack 2 is applied to the constant voltage circuit 207, so that the a low-voltage direct current of, for example, 5V is supplied to the microcomputer 211, thereby starting the microcomputer 211. The circuit diagram is shown as if the terminals 15 include only the terminals 15a and 15b connected to the plus terminal (+) and the minus terminal (−) of the battery pack 2, but other terminals, such as a terminal connected to a LD terminal of the battery pack 2 and a terminal connected to an ID terminal of the battery pack 2, are actually provided. Also, although circuits for connecting the LD terminal or the ID terminal and for connecting the microcomputer 211 are provided, the descriptions thereof are omitted in the circuit diagram of FIG. 7 for simplicity of explanation. The constant voltage circuit 207 is a known DC-DC converter including a three terminal regulator 209, which is configured by an input terminal, an output terminal, and a ground, and capacitors 208 and 210 provided on front and rear sides of the three terminal regulator 209 for preventing an oscillation. An output voltage of the constant voltage circuit 207 is supplied to the microcomputer 211 and to each of electronic elements in the controller.

The main power switch circuit 214 includes the main power switch 220, which is configured by a soft touch switch provided on the operation panel 16 (see FIG. 3) or the like, and a circuit for keeping an ON state of the main power circuit 220. The circuit for keeping the ON state of the main power circuit 220 is configured by transistors 221, 226 and 228, a FET 230, a capacitor 219, a plurality of resistors 215, 217, 218, 222 to 227, and 231, and a diode 216. For the main power switch circuit 214, ON and OFF states of the main power are alternately repeated each time when the touch-type main power switch 220 is pressed. According to the present embodiment, the ON state of the main power switch circuit 214 is kept by configuring such an electric circuit. This is intended to allow the main power to be turned off by an instruction from the microcomputer 211 by configuring to block the FET 230 by the microcomputer 211 (circuits for this purpose will be described later).

The output of the main power switch 214 is inputted to the battery voltage detection circuit 235 and the constant voltage circuit 207. The battery voltage detection circuit 235 is configured by a serial circuit including a voltage dividing resistor 236 and a voltage dividing resistor 237, and one end of the voltage dividing resistor 236 is connected to an A/D input terminal of the microcomputer 211. In addition, the outputs from the plus and minus terminals of the battery pack 2 is inputted to the motor 153 via the switch 21, the output stop circuit 243, and a diode 257. For electric tools, a motor is typically rotated when the switch 21 is turned on. According to the present embodiment, however, the motor 153 cannot be rotated unless the switch 21 is pulled while the main power switch circuit 214 is in the ON state. The output stop circuit 243 is a circuit for forcibly stopping rotation of the motor 153 under the control of the microcomputer 211, even when the switch 21 is turned on. The trigger detection circuit 240 is configured by a serial circuit including a voltage dividing resistor 241 and a voltage dividing resistor 242, and one end of the voltage dividing resistor 241 is connected to an A/D input terminal of the microcomputer 211.

The output stop circuit 243 is provided with a FET 245 for stopping an output. The FET 245 can employ, for example, a MOS-type FET, and can switch a conductive or non-conductive state between a source and a drain by turning a gate signal on or off. The gate signal of the FET 245 is grounded via a resistor 247 and a FET 248. The gate signal of the FET 248 is connected to a D/A output terminal of the microcomputer via a resistor 249. When the High signal is outputted from the microcomputer, the FET 248 becomes a conductive state so that the gate signal of the FET 245 becomes a predetermined voltage to turn the FET 245 on. Thus, rotation of the motor 153 is started by pulling the switch 21. On the contrary, if the Low signal is outputted from the microcomputer 211, the FET 248 is turned off so that the gate signal of the FET 245 becomes zero to turn the FET 245 off. As a result, the motor 153 is not rotated even if the switch 21 is pulled. Accordingly, when a certain situation occurs during rotation of the motor 153, the microcomputer 211 can output the Low signal to the output stop circuit 243 to stop the motor 153. In addition, the output stop circuit 243 is additionally provided with a FET 251 for controlling to drop the gate signal of the FET 248 to the ground by a signal from the switch 55 or the Hall IC 56 included in the connection section 50 accommodating the rod extension sensors.

Diodes 253 and 254 are arranged between the gate of the FET 251 and the switch 55 or the Hall IC 56. Also, the signal line from the switch 55 or the Hall IC 56 is provided with resistors 255 and 256 for determining a reference potential. In this case, the switch 55 is turned off when the movable pipe 80 is extended from the fixed pipe 40 to a predetermined position, and turned on when the movable pipe 80 is not extended. Similarly, a potential, which is an output of the Hall IC 56 and is supplied to the FET 251 via the diode 254, becomes Low when the movable pipe 80 is extended from the fixed pipe 40 to the predetermined position, and becomes High when the movable pipe 80 is not extended. By providing the FET 251 in this way, when the movable pipe 80 is not extended from the fixed pipe 40 to the predetermined position, the gate signal of the FET 251 becomes High and the output from the output stop circuit 243 is stopped, thereby stopping supplying of an electric power to the motor 153. As described above, according to the present embodiment, in addition to the microcomputer 211 being configured to control the output stop circuit 243 depending on the outputs of the rod extension sensors as the extending detection unit, the outputs of the rod extension sensors are directly transmitted to the output stop circuit 243. Accordingly, supplying of an electric power to the motor 153 is surely stopped when the rod has been retracted from the extended state or is retracted during operation. Also, if the signal line 58 is disconnected or an output of any one of the sensors is different from that of the other, the microcomputer 211 serves as an abnormal detection unit for detecting an abnormal state, and thus can supply the Low signal to the FET 248 via the resistor 249, thereby stopping the motor 153.

The main power automatic stop circuit 203 is a circuit for interrupting the power supply of the whole of the electric bush cutter 1 under the control of the microcomputer 211. A collector and an emitter of a transistor 205 of the main power automatic stop circuit 203 are respectively connected to the gate of the FET 230 via a resistor 204 and to the ground, and a base thereof is connected to an A/D output port of the microcomputer via a resistor 206. If the High signal is outputted from the microcomputer 211 to the gate of the transistor 205, a conductive state between the collector and the emitter of the transistor 205 is achieved, so that a predetermined voltage is applied to the gage of the FET 230, thereby becoming the same state as when the main power switch 220 is pressed. Thus, the transistor 228, which was in an ON state until this time, is turned off to interrupt the main power.

As described above, according to the circuit configuration of the present embodiment, when the movable pipe 80 is not extended from the fixed pipe 40 to the predetermined position or suddenly retracted from the extended state during a work, and when an abnormality, in which the signal line 58 is disconnected, an output of any one of the sensors is different from that of the other, or the like, occurs, supplying of an electric power to the motor 153 will be immediately stopped, thereby embodying an contracting rod type electric bush cutter having a high safety.

Next, a control procedure of the electric bush cutter 1 will be described with reference to a flow chart of FIG. 8. Firstly, when the battery pack 2 is mounted on the battery mounting portion 11a and the main power switch 220 is turned on, an electric power is supplied to the microcomputer 211, thereby starting the microcomputer 211. Then, the microcomputer 211 executes a boot program stored therein to perform a predetermined initial setting (Step 261). Next, the microcomputer 211 outputs the Low signal to the FET 248 to interrupt between the source and the drain of the FET 245, thereby preventing the electric power from being outputted to the motor 153 (Step 262). This step is intended to prevent a malfunction in which, while the trigger lever 44 is pulled, the main power switch 220 is pressed so that the cutting blade 155 suddenly starts to rotate. Then, the microcomputer 211 executes a rod extension detection routine for determining whether or not the movable pipe 80 is fully extended from the fixed pipe 40, namely, is in the extended state upon cutting of bushes as shown in FIG. 1 (Step 263).

Here, a detailed procedure of the rod extension detection routine will be described with reference to a flow chart of FIG. 9. This sub-routine is configured to perform such a determination using output results of the Hall IC 56 as a magnetic sensor and the switch 55 of a mechanical type by executing a computer software by the microcomputer 211. Firstly, the microcomputer 211 determines whether or not the output of the Hall IC 56 as a magnetic sensor is Low (Step 291). That the output of the Hall IC 56 is Low indicates that the rod is in an extended state (i.e., a state shown in FIGS. 1 and 4). When the output of the Hall IC 56 is Low, the microcomputer 211 detects whether or not the output of the switch 55 of a mechanical type is Low (i.e., a closed state). That the output of the switch 55 is Low indicates that the rod is in the extended state (i.e., a state shown in FIGS. 1 and 4). Accordingly, in a case of Low in Step 292, outputs of such two rod extension sensors coincide with each other. Thus, the microcomputer 211 confirms that the rod is in the extended state (Step 293), and then the rod extension detection routine is ended, thereby returning to the flow of FIG. 8.

If the output of the Hall IC 56 is High in Step 291, it can be determined, through the detection using the Hall IC 56, that the rod is in a retracted state. Then, whether or not the output of the switch 55 of a mechanical type is Low is detected (i.e., a closed state) (Step 294). In this time, when the output of the switch 55 is High, it is detected also through the switch 55 that the rod is in the retracted state. Accordingly, because outputs of two rod extension sensors coincide with each other, the microcomputer 211 confirms that the rod is in the retracted state (Step 296), and then the rod extension detection routine is ended, thereby returning to the flow of FIG. 8. On the contrary, if the output of the switch 55 is High in Step 292 or the output of the switch 55 is Low in Step 294, outputs of two rod extension sensors do not coincide with each other. Accordingly, the microcomputer 211 determines that one of the rod extension sensors is abnormal (Step 295), and then the rod extension detection routine is ended, thereby returning to the flow of FIG. 8.

Figures 9, 10:
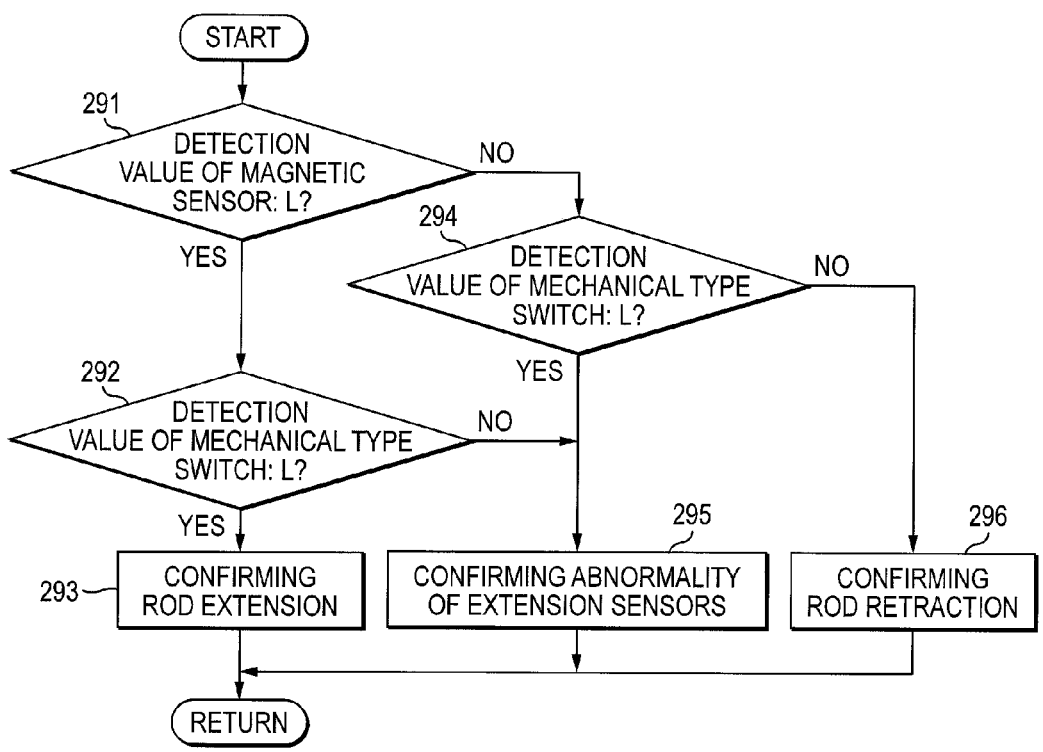
FIG. 9 is a flow chart showing a detailed procedure of a rod extension detection routine in Steps 263 and 269 of FIG. 8.
FIG. 10 is a view showing an example of a determination table to be used in the rod extension detection routine of FIG. 9.

FIG. 10 is a table showing combinations of outputs of the switch 55 and the magnetic sensor (Hall IC 56) depending on the determination result in the flow chart of FIG. 9. Here, when corresponding to the combination conditions shown in the figure, it can be determined that the rod is in the "extended state" or the "retraced (non-extended) state". As can be seen from the figure, it is not recognized that the rod is in the extended state unless the switch 55 is in a closed state. This means that the motor 153 does not rotate when the switch 55 is in an open state for any reasons, such as disconnection of the signal line 58 or a failure of the switch 55. Also, both outputs of the switch and the magnetic sensor are configured to be High in the retracted state. Therefore, without intervening the microcomputer 211, their outputs are used as a trigger (using a signal through the diodes 253 and 254 in FIG. 7) to directly control the output stop circuit 243, thereby stopping rotation of the motor.

Figure 8:
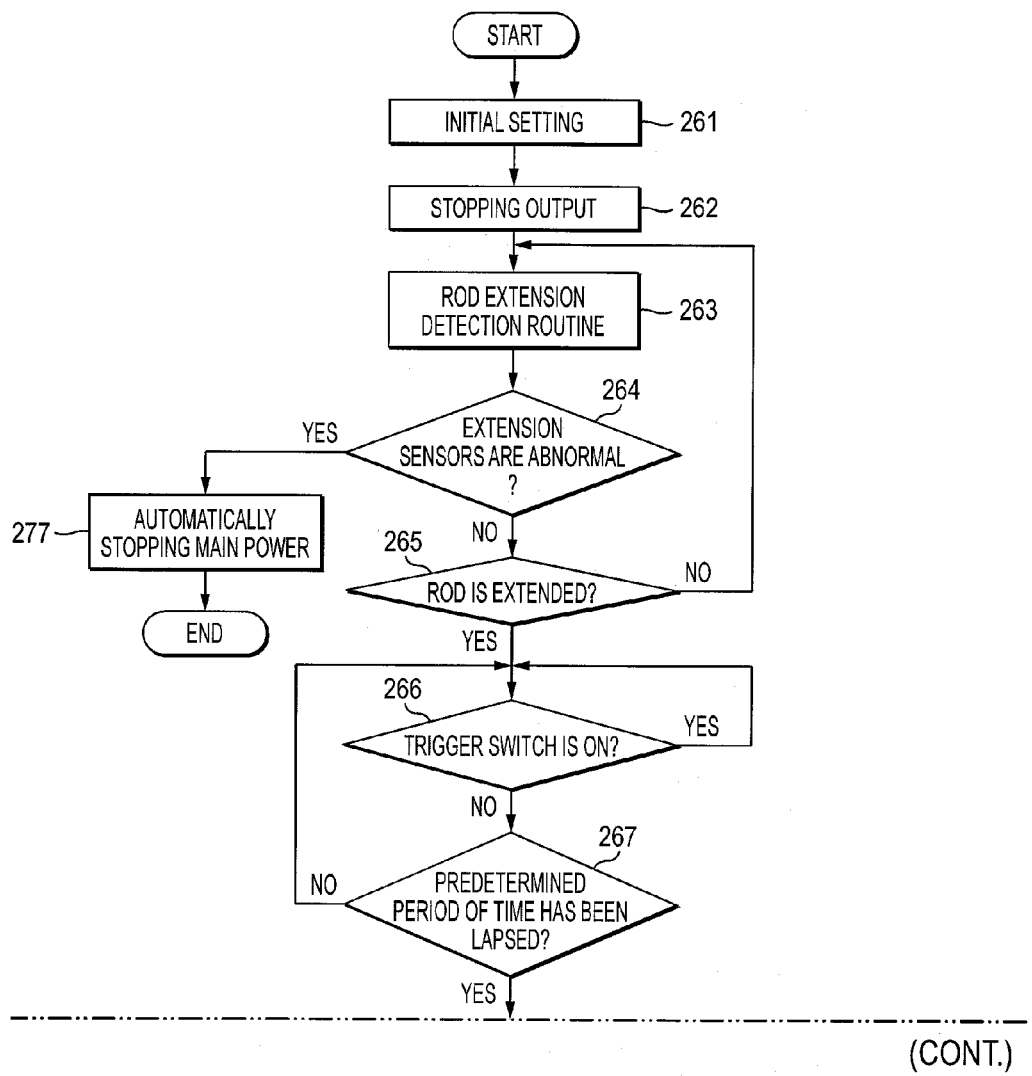
FIG. 8 is a flow chart of controlling the electric bush cutter 1 of FIG. 1.

The procedure returns again to Step 264 in the flow chart of FIG. 8. The microcomputer 211 determines in Step 264 whether or not an abnormality has occurred in detection results of two rod extension sensors. If an occurrence of an abnormal state is detected in Step 295 of the flow chart of FIG. 9, the procedure proceeds to Step 277 and the microcomputer 211 outputs the High signal to the main power automatic stop circuit 203. As a result, the main power automatic stop circuit 203 interrupts the main power to cancel a state of the main power switch circuit 214 in which the main power switch is kept in the ON state, thereby stopping the electric bush cutter 1.

When there is no abnormality in detection results of two rod extension sensors in Step 264, whether or not the rod is extended is determined (Step 265), and if it has been confirmed that the rod is in the retracted state in Step 296 of FIG. 9, the procedure returns back to Step 263 and waits until the rod is extended. When the rod is in the extended state in Step 265, whether or not the switch 21 is turned on is determined (Step 266). Here, the switch 21 being on can mean that, for example, (1) the rod is extended by a weight of the motor located at the end portion thereof when the rod is lifted in a non-extended state, (2) the rod is extended in a state in which the trigger lever has been pulled by a certain obstacle, or the like. Thus, the microcomputer 211 is configured not to rotate the motor 153, unless the microcomputer 211 firstly confirms the OFF state of the switch 21 after the rod is extended in Step 265. In this time, when the trigger lever 44 is opened after the rod is extended during such a series of flows, the microcomputer determines whether or not a predetermined period of time has elapsed (Step 267), and if the predetermined period of time has not elapsed, the procedure returns back to Step 266. This is a safety mechanism for preventing the motor 153 from being started immediately after the rod is extended, in which a waiting of approximately 0.5 to 3 seconds as the predetermined period of time is done.

After the predetermined period of time has elapsed in Step 266, namely the predetermined period of time has elapsed in a state in which the trigger lever 44 is released, the rod extension detection routine as shown in the flow chart of FIG. 9 is again executed (Step 268). Then, the microcomputer 211 determines whether or not the rod extension sensors are abnormal, using the execution result of the rod extension detection routine. When the rod extension sensors are abnormal, the microcomputer 211 outputs the Low signal to the output stop circuit 243 to stop outputting of an electric power to the motor 153 (Step 278), and also outputs the High signal to the main power automatic stop circuit 203 to interrupt the main power (Step 279), thereby stopping the electric bush cutter 1.

If detection results of two rod extension sensors are not abnormal in Step 269, whether or not the rod is extended is determined (Step 270), and when the rod is not extended, the microcomputer 211 outputs the Low signal to the output stop circuit 243 to stop outputting of an electric power to the motor 153 and thus to stop the motor if the motor is rotating (Step 280). In addition, when the switch 21 is in the ON state, the procedure returns to Step 280 to keep the stop state of the motor 153, whereas when the switch 21 is in the OFF state, the procedure returns to Step 268 (Step 281). In the present embodiment as described above, since the rod is configured to be extended or retracted, the microcomputer 211 is configured to keep the stop state of the motor 153 until the switch 21 is surely turned off when the rod is not in the extended state, thereby further enhancing the safety.

If it is determined in Step 270 that the rod is extended, whether or not the switch 21 has been turned on by a worker is determined (Step 271). When the switch 21 is on, the microcomputer 211 outputs the High signal to the output stop circuit 243 to allow supplying of an driving electric current to the motor 153 (Step 272). As a result, the electric power from the battery pack 2 is supplied to the motor 153 via the boosting circuit (not shown), so that the motor 153 rotates at a rotational number set on the dial 20, and thus a worker can perform a work of cutting bush, such as grass. Next, the microcomputer 211 determines from an output of the battery voltage detection circuit 235 whether or not the battery is in an over-discharged state, namely, whether or not the battery voltage has been decreased, and if it is not in the over-discharged state, the procedure returns to Step 268 (Step 273). The term over-discharged used herein means a state where the battery is exhausted. However, in Step 268, a value of an electric current flowing through the motor 153 may be observed by a current detection circuit (not shown) and in a case of overcurrent, the procedure may transit to Step 274.

If the switch 21 is off in Step 271 or the over-discharging is confirmed in Step 273, the microcomputer 211 outputs the Low signal to the output stop circuit 243 to stop outputting of an electric power to the motor 153 and thus to stop rotation of the motor (Step 280). Then, the microcomputer 211 determines from the output of the battery voltage detection circuit 235 whether or not the battery is in the over-discharged state, and if not in the over-discharged state, the procedure returns to Step 268 (Step 275). In a case of being in the over-discharged state, the microcomputer 211 outputs the High signal to the main power automatic stop circuit 203 to interrupt the main power (Step 276), thereby stopping the whole of the electric bush cutter 1.

By performing controlling as described above, when the motor 153 is rotating, and it is detected in Step 271 that the switch 21 is returned or in Step 273 that the battery pack 2 is in the over-discharged state during the rotation of the motor 153, outputting of an electric power to the motor 153 is stopped (Step 274). Next, the microcomputer 211 determines from the output of the battery voltage detection circuit 235 whether or not the battery is in the over-discharged state (Step 275), and, in a case of being in the over-discharged state, outputs the High signal to the main power automatic stop circuit 203 to interrupt the main power, thereby stopping the electric bush cutter 1 (Step 276). If not in the over-discharged state in Step 276, the procedure returns to Step 268.

As described above, by performing the control of the flow chart as shown in FIG. 8 using the microcomputer 211, electricity is not supplied from the battery pack 2 to the motor 153 when the movable pipe 80 is not extended to a defined position, and thus the motor 153 cannot rotate. Also, if the movable pipe 80 is extended to the defined position while the trigger lever 44 has been pulled, a sudden starting of the motor 153 is prevented. In addition, when the movable pipe 90 is retracted from the defined position and becomes a non-extended state due to a certain reason during rotation of the motor 153, supplying of electricity to the motor 153 is immediately stopped, thereby realizing the contracting rod type electric bush cutter 1 having high safety.

Second Embodiment

Figure 11:
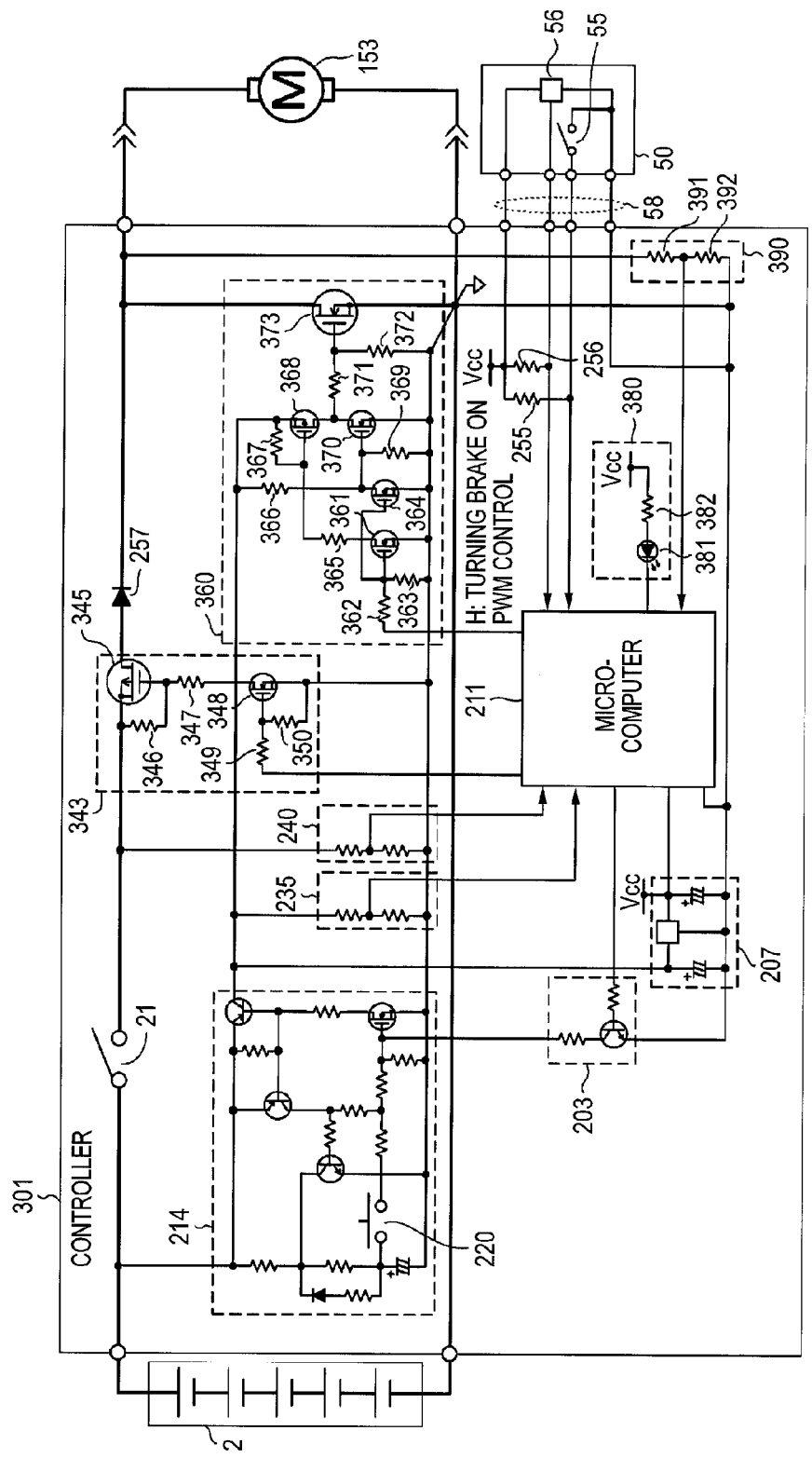
FIG. 11 is a circuit diagram of an electric bush cutter according to a second embodiment of the present invention.

Hereinafter, a circuit diagram according to a second embodiment of the present invention will be described with reference to FIG. 11. A controller 301 according to the second embodiment is mounted on the circuit board 13 as shown in FIG. 3, and configurations or components other than electric circuits mounted on the circuit board 13 are exactly identical to those described in the first embodiment. The controller 301 includes a switch 21, a main power switch circuit 214, a main power automatic stop circuit 203, a constant voltage circuit 207, a battery voltage detection circuit 235, a trigger detection circuit 240 and a microcomputer 211 identical to those of the first embodiment, and accordingly the repeated description with respect to internal configurations or actions thereof will be omitted. An output stop circuit 343 is essentially operated in the same manner as the output stop circuit 243 (see FIG. 7) of the first embodiment, in that the output stop circuit 343 receives a stop signal (i.e., a High signal with respect to a gate of a FET 348) from the microcomputer 211 to interrupt between a source and a drain of a FET 345. However, the output stop circuit 343 of the second embodiment does not include configurations (i.e., the diodes 253 and 254, the FET 251 and the resistor 252 in FIG. 7) for directly interrupting between the source and the drain of the FET 345 for stopping an output, depending on outputs from the rod extension sensor (the connection section 50). Meanwhile, it does not mean that such configurations are unnecessary in the second embodiment, and accordingly, the configurations may be added to the circuits of FIG. 11.

According to the second embodiment, the controller 301 is provided with an electronic brake circuit 360. The electronic brake circuit 360 brakes rotation of the motor 153 at a predetermined strength (e.g., a braking force weaker than a sudden braking) by intermittently controlling a braking current supplied to the motor 153. The motor 153 used in the present embodiment employs a coreless motor and rotates by inertia for a long while even if an electric current supplied to the motor 153 is interrupted. Therefore, the electronic brake circuit 360 is provided to supply an electric current acting to brake the motor 153, namely an braking current, thereby braking the motor 153. The electronic brake circuit 360 is essentially provided with a FET 373 for braking adapted to short between a plus terminal and a minus terminal of the motor 153 and four FETs 361, 364, 368 and 370 for driving the FET 373. For example, MOSFET (Metal-Oxide-Semiconductor Field-Effect Transistor) may be used as the FET 373 for braking, and a conductive state between a source and a drain thereof is on/off controlled by a signal from the microcomputer 211.

Firstly, when a High signal for electrical braking is generated from the microcomputer 211, the signal is inputted as gate signals of the FETs 361 and 364 via a resistor 362. The FETs 361 and 364 are grounded via a resistor 363, and also the FETs 361 and 364 are simultaneously turned on (i.e., a conductive state between the source and the drain) by the High signal from the microcomputer 211. If the drains of the FETs 361 and 364 are turned on, namely, becomes High, the FET 368 is turned on and the FET 370 is turned off. When the FET 368 is on and the FET 370 is off, a predetermined voltage is applied to the gate of the FET 373 for braking via a resistor 371, so that a state between the source and the drain of the FET 373 is turned on. The source of the FET 373 is connected to the plus terminal of the motor 153 and the drain thereof is connected to the minus terminal, and thus the ON state between the source and the drain of the FET 373 means that the plus terminal of the motor 153 is short-circuited, thereby causing braking.

If the motor 153 is short-circuited, the motor 153 is suddenly braked and a rotation thereof is rapidly decreased. When wanting to stop the motor 153 in an emergency or when detecting extension or retraction of the rod due to a certain reason, it is preferred to suddenly brake the motor 153 while keeping the short-circuited state of the motor 153. However, when the trigger lever 44 is released, there is a case in which it is preferable that rotation of the motor 153 is stopped after a while or slowly, instead of a sudden braking. For example, during a bush cutting work, a worker performs the work while moving the cutting blade 155 to left or right by the handle pipe 42 by gripping the grip portion 43 of the hand pipe 42, but when moving the hand pipe 42 to the left or right, the trigger lever 44 can be inadvertently released. In this case, if the motor 153 is suddenly stopped, there is rather a possibility that trouble is caused to the work. Accordingly, the present embodiment is configured to control strength and timing of braking by the microcomputer 211.

During braking, namely in a case in which a state between the source and the drain of the FET 373 is on, if the output from the microcomputer 211 is changed from High to Low, the Low signal is inputted as the gate signals of the FETs 361 and 364 via the resistor 362, so that the FETs 361 and 364 are turned off (i.e., a non-conductive state between the source and the drain). When the FETs 361 and 364 are turned off, the FET 368 is turned off, but the FET 370 is turned on because a predetermined voltage is applied to a gate of the FET 370 via resistors 366 and 369. As a result, the gate signal of the FET 373 becomes Low, so that a state between the source and the drain of the FET 373 for braking is turned off, thereby releasing braking (the short-circuited state of the motor 153). According to the present embodiment, such a braking instruction signal from the microcomputer 211 is switched at a high speed between High and Low, thereby achieving a soft braking of the motor 153. This switching braking can be performed by using, for example, a PWM control, and the detailed description thereof will be described later.

An output voltage detection circuit 390 is a circuit for measuring a voltage between the terminals of the motor 153, and is configured by a serial circuit including a voltage dividing resistor 391 and a voltage dividing resistor 392, and one end of the voltage dividing resistor 391 is connected to an A/D input terminal of the microcomputer 211. Although not shown in FIG. 11, the circuit board 13 (see FIG. 3) is provided with a boosting circuit for driving the motor 153, and a rotational number of the motor 153 is controlled by varying an output voltage from the boosting circuit. Accordingly, the output voltage detection circuit 390 is a circuit for feeding back the output voltage to the motor 153. Also, the output voltage detection circuit 390 is additionally provided, because upon braking, a counter electromotive force generated from the motor 153 when the motor 153 is rotated by inertia cannot be detected by the battery voltage detection circuit 235.

The microcomputer 211 observes an electric current flowing through the motor 153, which is detected by a current detection circuit (not shown), or an output voltage from the battery pack 2, which is detected by the battery voltage detection circuit 235, by executing a program preliminary stored in a memory, to turn the main power switch circuit 214 off when the current flowing through the motor 153 exceeds a rated current of the motor 153, when the output voltage from the battery pack 2 is lowered below a predetermined value, or the like. Also, the microcomputer 211 automatically turns the main power switch circuit 214 off, when it is detected that an electric power is not supplied to the motor 153 for a predetermined period of time although the main power switch 214 is turned on. A battery information is inputted from an input terminal (ID terminal, not shown) to the microcomputer 211. When the battery information is inputted, the microcomputer 211 reads a voltage causing the battery to be over-discharged of from the battery information with reference to a table which is preliminary stored in an internal memory thereof. For example, the microcomputer 211 determines an over-discharging voltage as 8 V if the battery information includes information in which a rated voltage is 14.4 V, and also determines the over-discharging voltage as 10 V if a rated voltage is 18 V. The microcomputer 211 automatically turns the main power switch circuit 214 off, if the output voltage of the battery pack 2 is below the over-discharging voltage.

The battery voltage detection circuit 235 outputs a voltage proportional to the output voltage of the battery pack 2 to the microcomputer 211 by measuring an output voltage from the main power switch circuit 214. If the output voltage of the battery pack 2 detected by the battery voltage detection circuit 235 is an abnormal value, the microcomputer 211 turns the main power switch circuit 214 off, thereby stopping outputting of the battery pack 2. In this way, over-discharging of the battery pack 2 can be prevented.

Also, the microcomputer 211 automatically turns the main power switch circuit 214 off, if a period, during which a voltage from the battery voltage detection circuit 235 is inputted to the microcomputer 211 but an output from the current detection circuit (not shown) is not inputted thereto, exceeds a predetermined period of time stored in the memory. In this way, when the electric bush cutter 1 is left with the main power switch circuit remained on, or the like, the power of the electric bush cutter 1 can be automatically turned off.

A display circuit 380 is a circuit for lighting a LED 381 by a DC current generated in the constant voltage circuit 207, and includes a current limiting resistor 382 connected in series to the LED 381. Lighting of the LED 381 is controlled by the microcomputer 211. The LED 381 is a red light emitting diode arranged at the upper sided of the cord stopper 12, and is configured to be lighted in a normal state (i.e., no abnormality), to be slowly flickered in the over-discharged state of the battery and to be quickly flickered in other abnormal states (e.g., stop of the motor due to retraction of the rod, or the like), thereby serving as a means for informing an operation state or an error state to a worker. In addition, when the main power is interrupted by the microcomputer 211, the current supplied to the display circuit 380 is also interrupted, thereby turning the LED 381 off.

Figure 12:
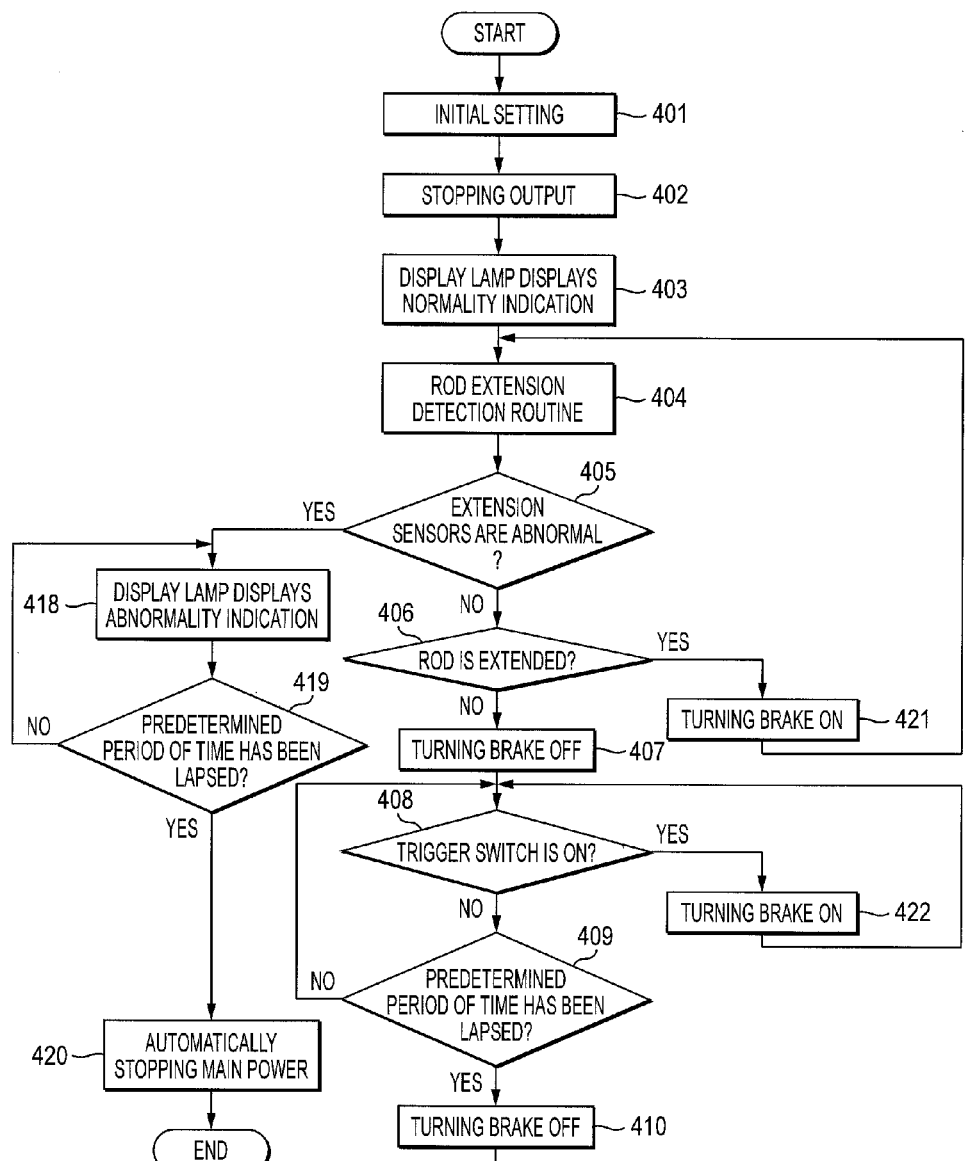
FIG. 12 is a flow chart of controlling the electric bush cutter according to the second embodiment of the present invention.

Next, a control procedure of the second embodiment of the present invention will be described with reference to a flow chart of FIG. 12. The flow chart of FIG. 12 is configured by adding the electric braking function and the display lamp function to the flow chart of the first embodiment as described in FIG. 8, and thus basic control flows are essentially identical to each other. Firstly, when the battery pack 2 is mounted and the main power switch 220 is turned on, the microcomputer 211 is started and then a boot program is executed, thereby performing a predetermined initial setting (Step 401). Next, the microcomputer 211 keeps a rotation-stopped state of the motor 153 by interrupting between the source and the drain of the FET 245 (Step 402). Then, the microcomputer 211 supplies an electric current to the display circuit 380, thereby lighting the LED 381 (Step 403). Preferably, this lighting state is a continuous lighting which indicates the normal state.

Here, lighting states of the LED 381 will be described with a table of FIG. 15. According to the present embodiment, the LED 381 employs one red light emitting diode and is configured to change lighting states thereof so that a worker can be informed. The LED 381 is continuously lighted in the normal state in which the main power switch 220 is on (i.e., a normality indication). When the remaining amount of the battery pack 2 is lower than a predetermined amount, namely in a case of the over-discharged state, the LED 381 is slowly flickered (i.e., an over-discharge indication). By this slow flickering, a worker can know that a work can not be continuously performed unless the battery pack 2 is charged or replaced. In the present embodiment, an "abnormality indication" in which the LED 381 is further quickly flickered is provided. This is displayed when signals from a plurality of the rod extension detection unit are not coincide with each other. Thereby, a worker can know that a failure of the electric bush cutter 1 has occurred.

The procedure returns again to the flow chart of FIG. 12. In Step 404, the microcomputer 211 executes a rod extension detection routine for determining whether or not the movable pipe 80 is extended from the fixed pipe 40, namely, whether or not the movable pipe 80 is in the extended state for cutting of bushes as shown in FIG. 1. The routine described in Step 404 may employ the same sub-routine as those described in FIG. 9. Then, the microcomputer 211 determines whether or not an abnormality has occurred in detection results of two rod extension sensors (Step 405). In this time, if an occurrence of an abnormal state is detected, the procedure proceeds to Step 418 and the microcomputer 211 cause the LED 381 to become a quick flickering state indicating the "abnormality indication". This "abnormality indication" is performed for a predetermined period of time (Step 419). Then, the microcomputer 211 outputs the High signal to the main power automatic stop circuit 203 to automatically interrupt the main power (Step 420). As a result, the electric bush cutter 1 is stopped.

When there is no abnormality in detection results of the two rod extension sensors in Step 405, whether or not the rod is extended is determined (Step 406), and if it has been confirmed that the rod is in the retracted state, the microcomputer 211 outputs the High signal to the electronic brake circuit 360, thereby braking the motor 153 (Step 421). Then, the procedure returns back to Step 404 and waits until the rod is extended. When the rod is in the extended state in Step 406, the microcomputer 211 sends the Low signal to the electronic brake circuit 360 to cancel the braking operation (Step 407) and then determines whether or not the switch 21 is turned on (Step 408). In this time, when the switch 21 is off, the microcomputer 211 determines whether or not a predetermined period of time has elapsed (Step 409), and if the predetermined period of time has not elapsed, the procedure returns back to Step 408.

After the predetermined period of time has elapsed in Step 409, the microcomputer 211 sends the Low signal to the electronic brake circuit 360 to cancel the braking operation (Step 410) and then executes the rod extension detection routine as shown in the flow chart of FIG. 9 (Step 411). Next, the microcomputer 211 determines whether or not the rod extension sensors are abnormal, using the execution result of the rod extension detection routine (Step 412). When the rod extension sensors are abnormal, the microcomputer 211 outputs the Low signal to the output stop circuit 343 to stop outputting of an electric power to the motor 153 (Step 433). Also, the microcomputer 211 outputs the High signal to the electronic brake circuit 360 to turn the brake on (Step 434), and causes the LED 381 to display the "abnormality indication", namely, to be quickly flickered for a predetermined period of time (Steps 435 and 436). If the predetermined period of time has lapsed, the microcomputer 211 outputs the High signal to the main power automatic stop circuit 203, thereby interrupting the main power (Step 437) and stopping the electric bush cutter 1.

When there is no abnormality in detection results of the two rod extension sensors in Step 412, whether or not the rod is extended is determined (Step 413), and if the rod is not extended, the microcomputer 211 outputs the Low signal to the output stop circuit 343 to stop rotation of the motor 153 (Step 429). Also, the microcomputer 211 outputs the High signal to the electronic brake circuit 360 to turn the brake on (Step 430), and causes the LED 381 to display the "abnormality indication", namely to be quickly flickered during a predetermined period of time (Step 431). In addition, when the switch 21 is in the ON state, the procedure returns to Step 429 to keep the stop state of the motor 153, whereas when the switch 21 is in the OFF state, the procedure returns to Step 411 (Step 432). In the present embodiment as described above, the rod is configured to be extended or retracted, and thus the microcomputer 211 is configured to keep the stop state of the motor 153 until the switch 21 is surely turned off when the rod is not in the extended state.

If it is determined in Step 413 that the rod is extended, whether or not the switch 21 has been turned on by a worker is determined (Step 414). When the switch 21 is on, the microcomputer 211 outputs the Low signal to the electronic brake circuit 360 to turn the brake off (Step 415), and outputs the High signal to the output stop circuit 343 to allow outputting of an driving electric current to the motor 153 (Step 416). As a result, the electric power from the battery pack 2 is supplied to the motor 153 via the boosting circuit (not shown), so that the motor 153 rotates at a rotational number set on the dial 20. Next, the microcomputer 211 determines from an output of the battery voltage detection circuit 235 whether or not the battery is in an over-discharged state (Step 417), and if not in the over-discharged state, the procedure returns to Step 411.

By performing controlling as described above, when the motor 153 is rotating, and it is detected in Step 414 that the switch 21 is returned or in Step 417 that the battery pack 2 is in the over-discharged state during the rotation of the motor 153, outputting of an electric power to the motor 153 is stopped (Step 423) and the High signal is outputted to the electronic brake circuit 360 to turn the brake on (Step 424). Next, the microcomputer 211 determines from the output of the battery voltage detection circuit 235 whether or not the battery is in the over-discharged state (Step 425), and if not in the over-discharged state, the procedure returns to Step 411. In a case of the over-discharged state, the microcomputer 211 causes the LED 381 to display the "over-discharge indication", namely, to be slowly flickered for a predetermined period of time (Steps 426 and 427). If the "over-discharge indication" has been displayed for the predetermined period of time, the microcomputer 211 outputs the High signal to the main power automatic stop circuit 203 to interrupt the main power, thereby stopping the electric bush cutter 1 (Step 428). Meanwhile, braking (soft braking) in Step 424 does not need to suddenly brake the motor, contrary to braking (sudden braking) when extension of the rod is detected or a certain abnormality is occurred. For a worker who has a habit of carelessly releasing the trigger lever 44, braking in Step 424 is preferably not the sudden braking, but the soft braking (i.e., a braking weakly applied). Therefore, in Step 424, the microcomputer 211 intermittently outputs the High signal to the electronic brake circuit 360 to aggressively control the braking. In this way, time intervals for outputting the High signal to the electronic brake circuit 360 can be controlled for each time interval to adjust braking states. This adjustment can be controlled by the microcomputer 211 using a software, and thus a braking control can be performed with high accuracy.

Figure 13:
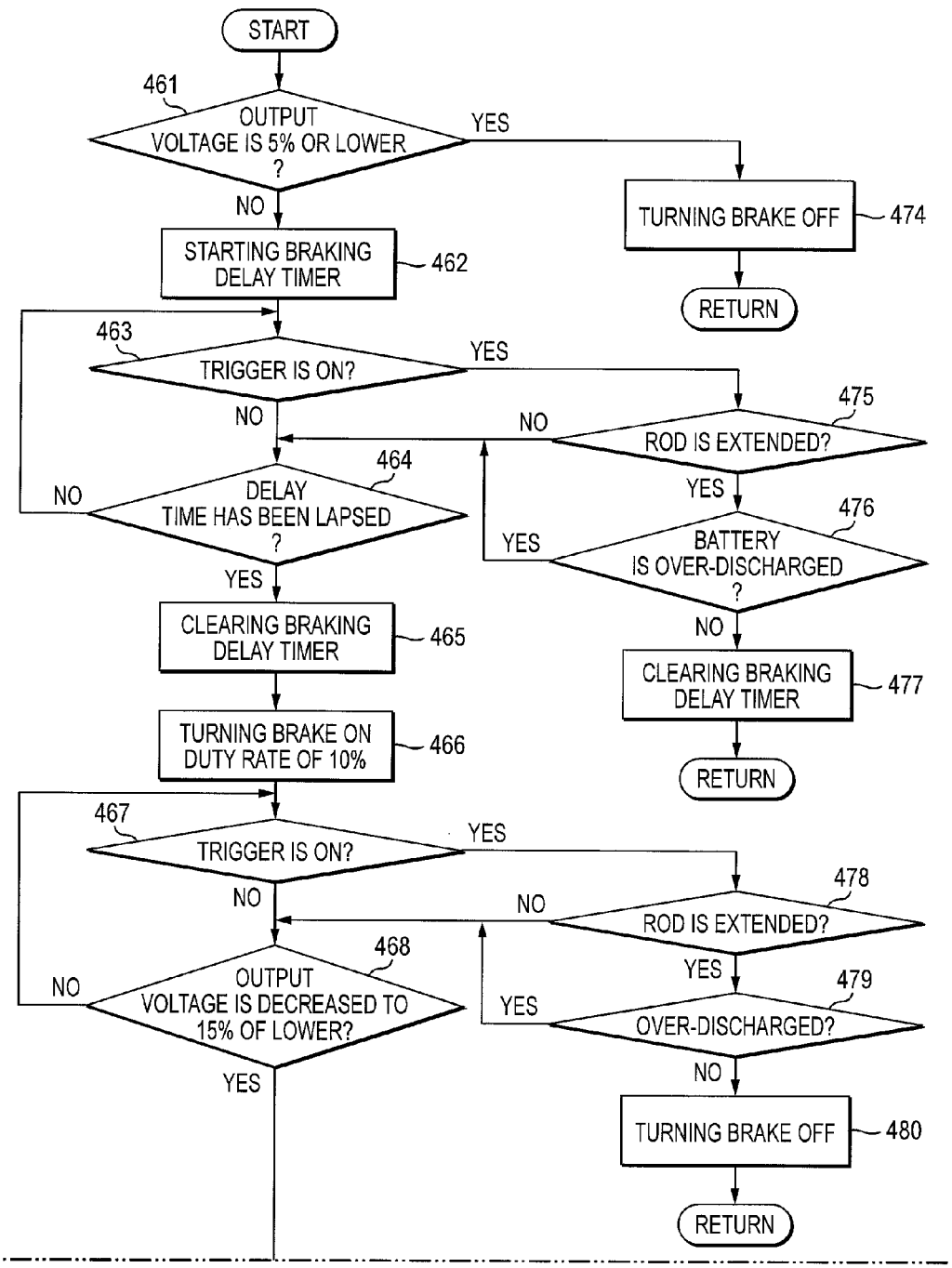
FIG. 13 is a flow chart showing a detailed procedure of a soft braking control in Step 424 of FIG. 12.

FIG. 13 is a flow chart showing a procedure for controlling the electronic brake in Step 424. This procedure can be controlled in software by executing a computer program by the microcomputer 211. Firstly, the microcomputer 211 determines whether or not an output voltage (i.e., a counter electromotive force generated from the motor 153) detected by the output voltage detection circuit 390 is 5% or lower (Step 461). The reason for this is that if the motor 153 is reduced in velocity to such an extent that the counter electromotive force is 5% or lower, the motor 153 will stop soon, so that electronic braking is not needed. When the output voltage is 5% or lower, the microcomputer 211 outputs the Low signal to the electronic brake circuit 360 to turn the brake off (Step 474), and then the procedure returns to Step 424 in FIG. 12. If the output voltage is higher than 5%, the microcomputer 211 starts a timer provided therein to delay a braking timing (Step 462). The reason that the electronic braking is not immediately performed but initiated after being delayed by a while is because of an intention to smoothly perform a work even if a worker has a habit of frequently releasing the trigger lever 44 while shaking side to side the rod during a bush cutting work. A period of time of delaying for a while may be approximately 0.3 to a few seconds, for example, 1 or 1.5 seconds.

Next, the microcomputer 211 determines whether or not the trigger lever 44 is turned on (Step 463), and if the trigger lever 44 is off, determines whether or not a set delay time has elapsed. If not elapsed, the procedure returns to Step 463. When a worker pulls again the trigger lever 44 in Step 463, namely, has no intention to perform braking, whether or not the rod is extended is determined (Step 475), and if the rod is extended, whether the battery pack 2 is in the over-discharged state is determined (Step 476). If the rod is retracted in Step 475 or the battery pack 2 is over-discharged in Step 476, the procedure transits to Step 464, thereby continuing the electronic braking. If the rod is extended in Step 475 and also the battery pack 2 is not over-discharged, this means that the worker dose not have an intention to perform braking, but an intention to continue a work. Therefore, the braking delay timer is cleared (Step 477), and then the procedure returns to Step 424 in FIG. 12.

Then, when a predetermined delay time has elapsed in Step 464, the microcomputer 211 clears the braking delay timer (Step 465), and outputs the High signal to the electronic brake circuit 360 to turn the brake on (Step 466). In this time, PWM control of the braking signal outputted from the microcomputer 211 is performed to be driven at a duty rate of 10% (Step 466). FIG. 14 is a view showing a method of performing the PWM control. FIG. 14A is a view showing a control situation at the duty rate of 10% driven in Step 466. A braking signal 491 is a signal outputted from the microcomputer 211 to the electronic brake circuit 360, and as can be seen from FIG. 11, the braking signal is a gate signal sent to the FETs 361 and 364 via the resistor 362. If the braking signal is controlled to the duty rate of 10% by the PWM control, the High signal is outputted during a time corresponding to 10% every 100 microseconds, i.e., during 10 microseconds, to perform the electronic braking. During 90 microseconds remained, Low signal is outputted from the microcomputer 211 to the electronic brake circuit 360. In this case, a frequency of the PWM control is 10 kHz, and this control is repeated. Meanwhile, the duty rate of the PWM control can be arbitrarily changed in a range of 0 to 100%. FIG. 14B shows a braking signal 492 when the duty rate is 50%. The braking signal 492 is controlled to the duty rate of 50% by the PWM control, the High signal is outputted during a time corresponding to 50% every 100 microseconds, i.e., during 50 microseconds, to perform the electronic braking. During 50 microseconds remained, Low signal is outputted from the microcomputer 211 to the electronic brake circuit 360.

The procedure returns again to Step 466 in FIG. 13. Then, the microcomputer 211 determines whether or not the trigger lever 44 is turned on (Step 467), and if the trigger lever 44 is off, determines whether or not the output voltage detected by the output voltage detection circuit 390 is decreased to 15% or lower. If not decreased, the procedure returns to Step 467 (Step 468). When the worker pulls again the trigger lever 44 in Step 467, namely, has an intention to cancel braking, whether or not the rod is extended is determined (Step 478), and if the rod is extended, whether the battery pack 2 is in the over-discharged state is determined (Step 479). If the rod is retracted in Step 478 or the battery pack 2 is over-discharged in Step 479, the procedure transits to Step 468, thereby continuing the electronic braking. If the rod is extended in Step 478 and also the battery pack 2 is not over-discharged, this means that the worker dose not have an intention to perform braking, but an intention to continue a work. Therefore, the brake is turned off (Step 480), and then the procedure returns to Step 424 in FIG. 12.

When the output voltage is decreased to 15% or lower in Step 468, the electronic braking is reduced due to voltage decrease and thus the duty rate of the PWM control is increased. However, before this, whether or not the output voltage (i.e., a counter electromotive force generated from the motor 153) detected by the output voltage detection circuit 390 is 5% or lower is determined (Step 469). In this time, if the motor 153 is reduced in velocity to such an extent that the output voltage is 5% or lower, the motor 153 is soon stopped. Thus, the microcomputer 211 outputs the Low signal to the electronic brake circuit 360 to turn the brake off (Step 481), and then the procedure returns to Step 424 in FIG. 12. If the motor 153 is not reduced in velocity to such an extent that the output voltage is 5% or lower, the microcomputer 211 controls to set the duty rate to 50% as shown in FIG. 14B and thus to strongly perform braking (Step 470).

Next, the microcomputer 211 determines whether or not the trigger lever 44 is turned on (Step 471), and if the trigger lever 44 is off, determines whether or not the output voltage detected by the output voltage detection circuit 390 is decreased to 5% or lower. If not decreased, the procedure returns to Step 471 (Step 472). When the worker pulls again the trigger lever 44 in Step 471, namely, has an intention to cancel braking, whether or not the rod is extended is determined (Step 482), and if the rod is extended, whether the battery pack 2 is in the over-discharged state is determined (Step 483). If the rod is retracted in Step 482 or the battery pack 2 is over-discharged in Step 483, the procedure transits to Step 472, thereby continuing the electronic braking. If the rod is extended in Step 482 and also the battery pack 2 is not over-discharged, this means that the worker does not have an intention to perform braking, but an intention to continue work. Therefore, the brake is turned off (Step 484), and then the procedure returns to Step 424 in FIG. 12. When the output voltage is decreased to 5% or lower in Step 472, the microcomputer 211 outputs the Low signal to the electronic brake circuit 360 to turn the brake off (Step 473), and then the procedure returns to Step 424.

As described above with reference to the flow chart of FIG. 3, according to the second embodiment, the electronic brake circuit 360 controlled in a PWM manner by the microcomputer 211 is provided to softly perform braking at a required timing and a required strength, thereby preventing life reduction of the motor or unnecessary consumption of the battery pack due to sudden starting and stopping of the motor. In FIG. 13, the duty rates for the PWM control are 10% and 50% but not limited thereto, and accordingly, a plurality of duty rates may be arbitrarily selected, or continuously variable duty rates may be used.

In the foregoing, although the present invention has been described with reference to two embodiments, the invention is not limited to such embodiments, and accordingly, various modifications and alterations can be made thereto. For example, although it has been described that the fixed pipe 40 and the moveable pipe 80 constituting the rod are approximately cylindrical tubes, the shapes thereof is not limited to the cylindrical shape as long as the stretchable cable connected from the operation unit 10 to the motor 153 may be arranged therein, and other cross-sectional shapes, such as square or polygonal, may also be used. Also, the fixation method of the movable pipe 80 in the connection section 50 is not limited to the fixation method using the fixing lever 62 as described in the embodiments, and accordingly, other known fixation methods may be used to fix the movable pipe 80 such that the movable pipe 80 cannot be moved in an axial direction relative to the fixed pipe 40. In addition, two extending detection unit arranged in the connection section 50 are not limited to the switch 55 and the Hall IC 56, and accordingly, any other sensors or switches may be used.

Also, in the foregoing embodiments, although the LED 381 for displaying operation states is used to display a capacity reduced state of the battery pack 2, an abnormal extended or retracted state of the rod, and abnormalities of the rod extension detection unit, such states may be displayed by different colors of the LED or by a plurality of LEDs, instead of differently flickering one LED 381. In addition, a liquid crystal display panel may be provided on the operation panel 16 to display detailed information, or a speaker or buzzer may be provided to generate sounds such that a worker can be informed.

Figure 16:
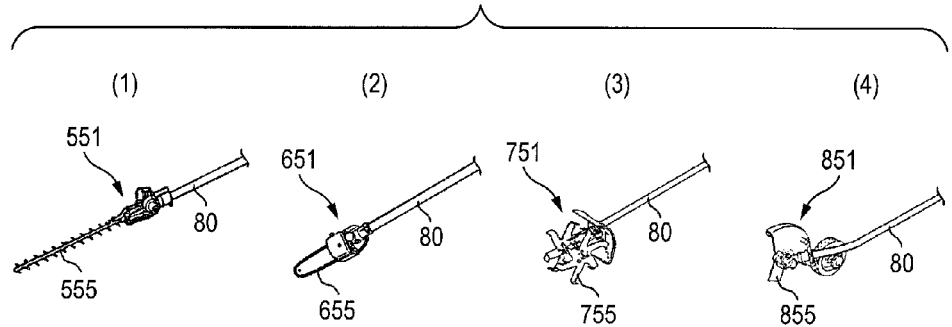
FIG. 16 is a view showing examples of driving units according to further embodiments of an electric working machine.

In addition, in the foregoing embodiments, although an example applied to an electric bush cutter as an example of an electric working machine has been described, the present invention is not limited to the electric bush cutter, but can be applied in the same manner to other electric working machines, which are provided with a working attachment driven by a motor at an end portion of a contracting rod. For example, as shown in FIGS. 16(1) to (4), electric working machines having various working attachments attached to the end portion of the moveable pipe 80, instead of the driving unit 151, can be considered. FIG. 16(1) is an example in which a hedge trimmer driving section 551 is attached to the end portion of the movable pipe 80. The hedge trimmer driving section 551 is provided with a cutting blade 555 moving reciprocally in a front-rear direction, to perform a work of trimming grass and branches. FIG. 16(2) is an example in which a pole saw hedge trimmer driving section 651 is provided to the end portion of the movable pipe 80. The pole saw hedge trimmer driving section 651 can perform a work of cutting branches by rotating a small saw chain 655, or the like. FIG. 16(3) is an example in which a cultivator driving section 751 is provided to the end portion of the movable pipe 80. The cultivator driving section 751 can perform a work of plowing surface soils by rotating a number of claws 755. FIG. 16(4) is an example in which an edger driving section 851 is provided to the end portion of the movable pipe 80. The edger driving section 851 can perform a work of making edges of lawns and the like even by a rotating cutting blade 855. Meanwhile, according to the present invention, if the electric working machine is a working machine which can be provided with driving sections for performing various works to the end portions of the rod and operate a driven object by a motor, types of work are not limited to the above examples.

The present invention provides illustrative, non-limiting examples as follows:

(1) In a first aspect, there is provided an electric working machine including:

a motor; a control unit configured to control rotation of the motor; a fixed part provided with a handle having a grip portion; a movable part held by the fixed part and is configured to be extendible by sliding relative to the fixed part; and a cutting blade provided to a end portion of the movable pipe and is configured to be driven by the motor; characterized in that the electric working machine further includes a detection unit which is connected to the control unit and is configured to detect whether or not the movable part is positioned at a predetermined extended position relative to the fixed part.

According to the first aspect, in the electric working machine having the movable part held by the fixed part and is configured to be extendible by sliding relative to the fixed part, the detection unit for detecting whether or not the movable pipe is positioned at a predetermined extended position relative to the fixed part is provided. Therefore, the control unit can perform a control depending on the detection results of the detection unit.

(2) In a second aspect, there is provided the electric working machine according to the first aspect, wherein the control unit allows the motor to be rotated only when the movable part is positioned at the predetermined extended position relative to the fixed part.

According to the second aspect, the control unit allows the motor to be rotated only when the movable part is positioned at the predetermined extended position relative to the fixed part, thereby preventing rotation of a working tool, such as a cutting blade, when a rod is retracted. As a result, an electric working machine having a high safety can be achieved.

(3) In a third aspect, there is provided the electric working machine according to the second aspect, wherein the fixed part includes: a housing provided with the control unit and a connection portion to which a power supply is configured to be connected; a fixed pipe fixed to the housing; and the handle provided to the fixed pipe, and wherein the movable part is held to be slidable relative to the fixed pipe.

According to the third aspect, because the movable pipe is held to be slidable relative to the fixed pipe, the movable pipe can be retracted when a work is not performed, thereby achieving a compact electric working machine allowing easy transport and storage.

(4) In a fourth aspect, there is provided the electric working machine according to any one of the first to third aspects, further including a switching element configured to interrupt an electric power supplied from the power supply to the motor, wherein the control unit is configured to control connection or interruption by the switching element depending on an output from the detection unit.

According to the fourth aspect, the control unit controls connection or interruption by the switching element for interrupting an electric power supplied from the power supply to the motor depending on an output from the detection unit. Therefore, stopping of the motor can be controlled depending on an extended or retracted state of the rod.

(5) In a fifth aspect, there is provided the electric working machine according to the fourth aspect, further including an interruption circuit for causing the switching element to become an interrupted state depending on output signals of the detection unit, wherein, if the detection unit detects that the movable part is not positioned at the predetermined position relative to the fixed part, the switching element is caused to become an interrupted state by the interruption circuit independently of the control of the switching element by the control unit.

According to the fifth aspect, an interruption circuit for causing the switching element to become an interrupted state depending on output signals of the detection unit is provided, and the switching element is caused to become an interrupted state by the interruption circuit independently of the control of the switching element by the control unit. Therefore, an electric working machine having a high reliability can be achieved by a redundancy control.

(6) In a sixth aspect, there is provided the electric working machine according to any one of the fourth aspect, wherein, when detecting that the detection result by the detection unit is changed from the extended position to the non-extended position during rotation of the motor, the control unit causes the switching element to become the interrupted state.

According to the sixth aspect, when detecting that the detection result by the detection unit is changed from the extended position to the non-extended position during rotation of the motor, the control unit causes the switching element to become the interrupted state, thereby surely preventing the motor from being rotated in the non-extended state.

(7) In a seventh aspect, there is provided the electric working machine according to the fourth aspect, wherein the control unit includes a microcomputer; wherein the switching element is a semiconductor switching element; and wherein the semiconductor switching element is controlled by a signal outputted from the microcomputer.

According to the seventh aspect, the control unit includes a microcomputer and the semiconductor switching element is controlled by a signal outputted from the microcomputer. Therefore, stopping and starting of the motor are precisely controlled by a computer control using a software.

(8) In an eighth aspect, there is provided the electric working machine according to the fourth aspect, wherein the control unit is configured to cause the switching element to become an interrupted state if the movable part is not positioned at the predetermined position relative to the fixed part.

According to the eighth aspect, the control unit causes the switching element to become an interrupted state when the movable pipe is not positioned at the predetermined position relative to the fixed part. Therefore, the motor can be surely stopped by an electrical control at any timing.

(9) In a ninth aspect, there is provided the electric working machine according to the first aspect, wherein the detection unit comprises a plurality of detection units, and wherein, if outputs of the plurality of detection units do not coincide with each other, the control unit confirms an error and does not allow the motor to be rotated.

According to the ninth aspect, a plurality of detection units are provided, and the control unit confirms an error if the outputs of the plurality of detection units do not coincide with each other and does not allow the motor to be rotated. As a result, a contracting rod type electric working machine having a high reliability can be achieved by a redundancy control.

(10) In a tenth aspect, there is provided the electric working machine according to the eighth aspect, further including an indication unit configured to indicate a driving state of the motor, wherein the detection unit includes a plurality of detection units, wherein, if the outputs of the plurality of detection units do not coincide with each other, the indication unit performs indication to a worker.

According to the tenth aspect, an indication unit for indicating a driving state of the motor is provided, and if the outputs of the plurality of detection unit do not coincide with each other, the indication unit performs indication to a worker. Therefore, the worker can easy know occurrence of an abnormality.

(11) In a eleventh aspect, there is provided the electric working machine according to the first aspect, wherein the control unit is configured to not allow the motor to be rotated if an output from the detection unit indicating that the movable part is positioned at the predetermined position relative to the fixed pipe has disappeared during rotation of the motor.

According to the eleventh aspect, the control unit does not allow the motor to be rotated if an output from the detection unit indicating that the movable pipe is positioned at the predetermined position relative to the fixed pipe has disappeared during rotation of the motor. As a result, an electric working machine having a high safety can be achieved.

(12) In a twelfth aspect, there is provided an electric working machine according to the first aspect, further including: a power supply line arranged inside the fixed part and the movable part and is configured to supply an electric power from a power supply to the motor; and a signal line configured to transfer a signal from the detection unit to the control unit.

According to the twelfth aspect, in the electric working machine having the movable part held to be slidable relative to the fixed part, the power supply line for supplying an electric power from a battery to the motor is arranged inside the fixed part and the movable part, and the signal line is separately provided to transfer a signal from the detection unit to the control unit. Therefore, the control unit can control rotation of the motor depending on an extended state of the movable part, thereby achieving an electric working machine having a high safety.

(13) In a thirteenth aspect, there is provided the electric working machine according to the first aspect, wherein the signal line is provided outside the fixed part.

According to the thirteenth aspect, the signal line is provided outside the fixed part. Thus, there is no influence on movement of the contracting parts and also interference of the signal line with the power supply line inside the fixed part and the movable part can be prevented. As a result, forces, such as bending or rubbing, are not applied to the signal line, thereby achieving an electric working machine having a high reliability.

(14) In a fourteenth aspect, there is provided the electric working machine according to the first aspect, wherein a connection section is provided in the vicinity of an end portion of the fixed part and is configured to lock the fixed part and the movable part to prevent the fixed part and the movable part from being misaligned relative to each other in an axial direction thereof; and wherein the detection unit is provided to the connection section.

According to the fourteenth aspect, the connection section for locking the fixed part and the movable part is provided, and the detection unit is provided to the connection section. Therefore, the movable part can be firmly fixed so as not to move, and also the control unit can electrically detect a situation of fixation by the output from the detection unit and then feed back the detected result for controlling the motor.

(15) In a fifteenth aspect, there is provided the electric working machine according to the first aspect, wherein the detection unit has a lever for detection; and wherein a sleeve having a recess allowing the lever to be received therein is attached to the movable part.

According to the fifteenth aspect, the detection unit has a lever for detecting, and the sleeve having a recess allowing the lever to be received therein is attached to the movable part. Thus, a position of the recess is located can be detected by the lever, and as a result, whether or not the movable part is positioned at the predetermined extended position can be detected surely and in a simple manner.

(16) In a sixteenth aspect, there is provided the electric working machine according to the fourteenth aspect, wherein the fixed part includes: a housing provided with the control unit; a fixed pipe fixed to the housing; and the handle provided to the fixed pipe, and wherein the handle is fixed to the fixed pipe at a position between the connection section and the housing.

According to the sixteenth aspect, the handle is fixed to a portion having a high rigidity, such as the fixed pipe. Therefore, an electric working machine having the same usability as that of a case of using a typical fixed rod (pipe) can be achieved.

(17) In a seventeenth aspect, there is provided the electric working machine according to any one of the twelfth aspect, wherein the power supply line is a stretchable cable in which a distance between opposing ends thereof can be changed.

According to the seventeenth aspect, the power supply line is a stretchable cable in which a distance between opposing ends thereof can be changed. Therefore, movement of the movable pipe is not interfered, thereby achieving a contracting rod type electric working machine having a contracting type having a high durability. In addition, since the signal line is arranged outside the fixed pipe, interference with the stretchable cable can be prevented, thereby allowing stretch of the cable to be performed smoothly.

(18) In an eighteenth aspect, there is provided the electric working machine according to the seventeenth aspect, wherein the stretchable cable is a curled cord.

According to the eighteenth aspect, because the stretchable cable is a curled cord, the cable is relatively inexpensive and durable, and also can realize a smooth contracting operation.

(19) In a nineteenth aspect, there is provided the electric working machine according to the twelfth aspect, wherein the signal line is arranged along the fixed part while being received in a tube.

According to the nineteenth aspect, the signal line is arranged along the fixed part with the signal line received in a bellows tube, and as a result, breakage or damage due to an impact and the like from the outside can be prevented.

(20) In a twentieth aspect, there is provided an electric working machine according to the first aspect, further comprising a trigger switch configured to allow rotation of the motor, wherein, if the movable part is moved from a non-extended position to the extended position while the trigger switch is being pulled, the electric working machine continues an operation which had been performed when the movable part was in the non-extended position.

According to the twentieth aspect, rotation of the motor is allowed only when the movable part is positioned at the predetermined extended position relative to the fixed part, and if the movable part is changed from a non-extended position to the extended position while the trigger switch is being pulled, the electric working machine continues an operation (stop operation) which had been performed when the movable part was in the non-extended position. Therefore, even if the trigger switch is turned on when a movable pipe has been extended by a certain cause, a malfunction in which the motor is suddenly started can be prevented, thereby safely performing an operation of extending or retracting the rod.

(21) In a twenty first aspect, there is provided the electric working machine according to the twentieth aspect, wherein the control unit is configured to detect a pulling state of the trigger switch when a detection result by the detection unit is changed from the non-extended position to the extended position; and wherein, when it is detected that the trigger switch is maintained in a pulled state, the control unit keeps the motor to be not allowed to be rotated until the trigger switch is released.

According to the twenty first aspect, if the trigger switch has been pulled when being changed from the non-extended position to the extended position, the control unit keeps the motor to be not allowed to be rotated until the trigger switch is released. Rotation of the motor is not started unless the trigger switch is again pulled after a worker firstly releases the trigger switch and thus a safety state is secured. As a result, an abnormal operation contrary to an intention of a worker cannot be occurred, thereby achieving a contracting rod type electric working machine having a high safety.

(22) In a twenty second aspect, there is provided the electric working machine according to the twenty first aspect, wherein, when detecting that the detection result by the detection unit is changed from the non-extended position to the extended position, the control unit keeps the motor to be not allowed to be rotated for a predetermined period of time regardless of the pulling state of the trigger switch.

According to the twenty second aspect, when detecting that the rod is changed from the non-extended position to the extended position, the control unit keeps the motor to be not allowed to be rotated during a predetermined period of time regardless of the pulling state of the trigger switch. Thus, even if the trigger switch has been pulled when the rod is changed from the non-extended position to the extended position and also the trigger switch is released for a while due to a certain cause, the stopped state of the motor can be surely kept. Also, if the interrupted state is kept within a few seconds, an adverse influence on operability by a worker is not caused.

(23) In a twenty third aspect, there is provided the electric working machine according to the twenty first aspect, wherein after keeping the motor to be not allowed to be rotated for the predetermined period of time, the control unit allows the motor to be rotated when release of the trigger switch is detected and the detection result by the detection unit becomes the extended position.

According to the twenty third aspect, after keeping the motor to be not allowed to be rotated for the predetermined period of time, the control unit allows the motor to be rotated when release of the trigger switch is detected and the detection result by the detection unit becomes the extended position. Therefore, a contracting rod type electric working machine having a further enhanced safety can be achieved.

(24) In a twenty fourth aspect, there is provided the electric working machine according to the first aspect, wherein, when detecting that the detection result by the detection unit is changed from the non-extended position to the extended position, the control unit keeps the motor to be not allowed to be rotated for a predetermined period of time regardless of the pulling state of the trigger switch.

According to the twenty fourth aspect, when detecting that the detection result by the detection unit is changed from the extended position to the non-extended position during rotation of the motor, the control unit keeps the motor to be not allowed to be rotated, thereby surely preventing the motor from being rotated in the non-extended state.

(25) In a twenty fifth aspect, twenty fifth aspect, there is provided the electric working machine according to the first aspect, wherein, if the detection unit detects that the movable part has moved from the extended position to a non-extended position during rotation of the motor, a braking force is applied to the motor.

This application claims priority from Japanese Patent Application No. 2012-031010 filed on Feb. 15, 2012, Japanese Patent Application No. 2012-031011 filed on Feb. 15, 2012, and Japanese Patent Application No. 2012-031012 filed on Feb. 15, 2012, the entire contents of which are incorporated herein by reference.

INDUSTRIAL APPLICABILITY

According to an aspect of the invention, there is provided an electric working machine which is provided with a detection unit for detecting an extending state of a rod and thus has an enhanced safety

What is claimed is:

1. A handheld electric working machine comprising:
    a motor;
    a battery configured to supply power to the motor;
    a control unit configured to control rotation of the motor;
    a fixed part provided with a handle having a grip portion to be grabbed by a user so as to hold the electric working machine;
    a movable part held by the fixed part and configured to change its position relative to the fixed part; and
    a cutting blade provided to an end portion of the movable part and is configured to be driven by the motor;
    wherein the movable part is configured to move between a first predetermined position at which a distance between the cutting blade and the grip portion of the fixed part is a first distance and a second predetermined position at which the distance between the cutting blade and the grip portion of the fixed part is a second distance longer than the first distance,
    wherein the electric working machine further includes a detection unit which is connected to the control unit and is configured to detect whether the movable part is in the first predetermined position or the second predetermined position, and
    wherein the detection unit includes an output unit configured to output a detection result signal, the control unit includes a reception unit configured to receive the detection result signal, and the control unit is configured to switch an electric circuit between the battery and the motor based on the received detection result signal.

2. The electric working machine according to claim 1, wherein the control unit disallows the motor from being rotated when the movable part is positioned at the first predetermined position and allows the motor to be rotated when the movable part is positioned at the second predetermined position.

3. The electric working machine according to claim 2, wherein the fixed part includes:
    a housing provided with the control unit and a connection portion to which a power supply is configured to be connected;
    a fixed pipe fixed to the housing; and
    the handle provided to the fixed pipe, and
    wherein the movable part is held to be slidable relative to the fixed pipe.

4. The electric working machine according to claim 2, further comprising a trigger switch configured to allow rotation of the motor,
    wherein, if the movable part is moved from the first predetermined position to the second predetermined position while the trigger switch is being pulled, the electric working machine continues to disallow the motor from being rotated.

5. The electric working machine according to claim 4, wherein the control unit is configured to detect a pulling state of the trigger switch when a detection result by the detection unit indicates that the movable part has moved from the first predetermined position to the second predetermined position; and wherein, when it is detected that the trigger switch is maintained in a pulled state, the control unit keeps the motor to be not allowed to be rotated until the trigger switch is released.

6. The electric working machine according to claim 5,
wherein, when detecting that the detection result by the detection unit indicates that the movable part has moved from the first predetermined position to the second predetermined position, the control unit keeps the motor to be not allowed to be rotated for a predetermined period of time regardless of the pulling state of the trigger switch.

7. The electric working machine according to claim 5,
wherein after keeping the motor to be not allowed to be rotated for the predetermined period of time, the control unit allows the motor to be rotated when release of the trigger switch is detected and the detection result by the detection unit indicates that the movable part is in the second predetermined position.

8. The electric working machine according to claim 1,
wherein the detection unit comprises a plurality of detection units, and
wherein, if outputs of the plurality of detection units do not coincide with each other, the control unit confirms an error and does not allow the motor to be rotated.

9. The electric working machine according to claim 1,
wherein the control unit is configured to not allow the motor to be rotated if an output from the detection unit indicating that the movable part is positioned at the second predetermined position has disappeared during rotation of the motor.

10. The electric working machine according to claim 1,
wherein a connection section is provided in the vicinity of an end portion of the fixed part and is configured to lock the fixed part and the movable part to prevent the fixed part and the movable part from being misaligned relative to each other in an axial direction thereof; and
wherein the detection unit is provided to the connection section.

11. The electric working machine according to claim 10,
wherein the fixed part includes:
a housing provided with the control unit;
a fixed pipe fixed to the housing; and
the handle provided to the fixed pipe, and
wherein the handle is fixed to the fixed pipe at a position between the connection section and the housing.

12. The electric working machine according to claim 1,
wherein the detection unit has a lever for detection; and
wherein a sleeve having a recess allowing the lever to be received therein is attached to the movable part.

13. The electric working machine according to claim 1,
wherein, when detecting that the detection result by the detection unit indicates that the movable part has moved from the second predetermined position to the first predetermined position during rotation of the motor, the control unit does not allow the motor to be rotated.

14. The electric working machine according to claim 1,
wherein, if the detection unit detects that the movable part has moved from the second predetermined position to the first predetermined position during rotation of the motor, a braking force is applied to the motor.

15. The electric working machine according to claim 1,
wherein the motor and the battery are physically connected to each other in both cases where the movable part is in the first predetermined position and the movable part is in the second predetermined position.

\* \* \* \* \*